(12) United States Patent
Donald et al.

(10) Patent No.: US 6,914,091 B2
(45) Date of Patent: Jul. 5, 2005

(54) COMPOSITIONS COMPRISING HYDROGENATED BLOCK COPOLYMERS AND END-USE APPLICATIONS THEREOF

(75) Inventors: Robert J. Donald, Midland, MI (US); Stephen F. Hahn, Midland, MI (US); James E. Pate, III, Sanford, MI (US)

(73) Assignee: The Dow Chemical Company, Midland, MI (US)

( * ) Notice: Subject to any disclaimer, the term of this patent is extended or adjusted under 35 U.S.C. 154(b) by 212 days.

(21) Appl. No.: 10/304,146

(22) Filed: Nov. 25, 2002

(65) Prior Publication Data

US 2003/0144418 A1 Jul. 31, 2003

Related U.S. Application Data

(60) Division of application No. 09/944,423, filed on Aug. 31, 2001, now abandoned, which is a continuation-in-part of application No. 09/575,063, filed on May 19, 2000, now abandoned.
(60) Provisional application No. 60/139,075, filed on Jun. 11, 1999, provisional application No. 60/146,008, filed on Jul. 28, 1999, and provisional application No. 60/193,313, filed on Mar. 30, 2000.

(51) Int. Cl.$^7$ ................................................ C08K 5/41
(52) U.S. Cl. ..................... 524/156; 524/158; 524/161; 524/186; 524/376; 524/394; 524/543; 525/88; 525/93; 525/98; 525/99; 525/313; 525/316
(58) Field of Search ............................ 524/156, 158, 524/161, 186, 376, 394, 543, 553, 556, 568, 571, 581, 583, 589; 525/88, 93, 98, 99, 313, 316

(56) References Cited

U.S. PATENT DOCUMENTS

| | | |
|---|---|---|
| 3,333,024 A | 7/1967 | Haefele et al. |
| 3,431,323 A | 3/1969 | Jones |
| 3,598,886 A | 8/1971 | Hoeg et al. |
| 3,644,588 A | 2/1972 | Hassell |
| 4,123,403 A | 10/1978 | Warner et al. |
| 5,178,926 A | 1/1993 | Tanaka et al. |
| 5,189,110 A | 2/1993 | Ikematu et al. |
| 5,191,024 A | 3/1993 | Shibata et al. |
| 5,219,940 A | 6/1993 | Nakano |
| 5,306,779 A | 4/1994 | Shibata et al. |
| 5,310,817 A | 5/1994 | Hergenrother et al. |
| 5,346,964 A | 9/1994 | Shibata et al. |
| 5,352,744 A | 10/1994 | Bates et al. |
| 5,539,021 A | 7/1996 | Pate et al. |
| 5,612,422 A | 3/1997 | Hucul et al. |
| 5,688,842 A | 11/1997 | Pate, III et al. |
| 5,905,097 A | 5/1999 | Walther |

FOREIGN PATENT DOCUMENTS

| | | |
|---|---|---|
| CA | 805219 | 1/1969 |
| CA | 912188 | 10/1972 |
| CA | 2072186 | 12/1992 |
| EP | 505110 | 9/1992 |
| EP | 726291 | 8/1996 |
| JP | 3234741 | 11/1989 |
| JP | 1-318015 | 12/1989 |
| JP | 3-160051 | 7/1991 |
| JP | 3 287677 | 12/1991 |
| JP | 04075001 | 3/1992 |
| JP | 5-271482 | 10/1993 |
| JP | 2586575 | 3/1997 |
| JP | 9118812 | 5/1997 |
| JP | 2725402 | 12/1997 |
| JP | 11286526 | 10/1999 |
| WO | WO 94/15997 | 7/1994 |
| WO | WO 94/21694 | 9/1994 |
| WO | WO 96/34896 | 11/1996 |
| WO | WO 98/16582 | 4/1998 |
| WO | WO 98/55886 | 12/1998 |

OTHER PUBLICATIONS

Macromolecules, vol. 27, No. 17, pp. 4639–4647, 1994.
Physics Today, Feb. 1999, pp. 32–38.
Novel Heat Resistant Plastics From Hydrogeneration of Styrene Polymers, pp. 427, 429, 431.

*Primary Examiner*—Jeffrey Mullis

(57) ABSTRACT

Flexible hydrogenated block copolymers can be successfully used in a variety of applications including films, profiles, sheets, coatings, injection molded articles, blow or rotational molded articles and pultruded articles.

7 Claims, 3 Drawing Sheets

COMPOSITIONS COMPRISING HYDROGENATED BLOCK COPOLYMERS AND END-USE APPLICATIONS THEREOF

CROSS REFERENCE STATEMENT

This application is a Divisional of U.S. application Ser. No. 09/944,423, filed Aug. 31, 2001, now abandoned which is a Continuation-in-Part of U.S. application Ser. No. 09/575,063, filed May 19, 2000, now abandoned which claims benefit of U.S. Provisional Application No. 60/139,075 filed on Jun. 11, 1999, U.S. Provisional Application No. 60/146,008 filed Jul. 28, 1999, and U.S. Provisional Application No. 60/193,313 filed on Mar. 30, 2000.

This invention relates to compositions of hydrogenated block copolymers.

BACKGROUND OF THE INVENTION

Partially hydrogenated block copolymers of vinyl aromatic and conjugated dienes such as hydrogenated styrene-butadiene-styrene copolymers are well known in the art. U.S. Pat. Nos. 3,333,024; 3,431,323; 3,598,886; 5,352,744; 3,644,588 and EP-505,110 disclose various hydrogenated block copolymers. Partially hydrogenated refers to hydrogenation of the diene portion of the block copolymer without aromatic hydrogenation or aromatic hydrogenation of 90 percent or less. Although these partially hydrogenated copolymers have been tested in various applications, they suffer from one or more shortcomings, including low heat resistance, poor physical properties, poor processability, and poor light stability. Attempts have been made to remedy these shortcomings by increasing the hydrogenation of the aromatic ring of the block copolymer. However, polymer scientists contend that fully hydrogenated styrene-butadiene-styrene copolymers have no useful properties at elevated temperatures, even if only slightly elevated. *Thermoplastic Elastomers*, 2$^{nd}$ edition, 1996, page 304, lines 8–12 states "Thus, polystyrene remains the choice for any amorphous hydrocarbon block copolymer. This last fact is clearly demonstrated in the case of the fully hydrogenated VCH-EB-VCH polymer. The interaction parameter is so severely reduced by hydrogenation that at only slightly elevated temperatures, the polymer loses all strength and appears to be homogeneously mixed at ordinary melt temperatures."

Specifically, hydrogenated diblock copolymers tend to have low viscosities and melt strengths making them difficult to process. Diblocks also have other disadvantages, due to their poor tensile properties. For the same reason they are not useful for making flexible materials, while rigid materials made from hydrogenated diblocks tend to be brittle.

Blends of partially hydrogenated block copolymers with other polymers are also known. For example, blends of cyclic olefin (co)polymers have been attempted as disclosed in EP-0726291, wherein cyclic olefin (co)polymers are blended with vinyl aromatic/conjugated diene block copolymers or hydrogenated versions thereof. Cyclic olefin (co) polymers (COC's) are known to have excellent heat distortion temperature, UV stability and processability. However, such copolymers suffer from poor impact resistance. Blends of COC's with partially hydrogenated block copolymers still suffer from an imbalance of physical properties due to the absence of aromatic hydrogenation within the block copolymer.

Therefore, there remains a need for compositions of fully or substantially hydrogenated block copolymers which have adequate viscosity and melt strength to ease processability, can be used in elastomeric applications and have a desirable balance of physical properties.

Additionally, uses for clear, substantially or fully hydrogenated block copolymers of vinyl aromatic and conjugated diene monomers, and polymer blends thereof, are still desired, wherein the copolymers are processable by conventional manufacturing technologies and possess useful physical properties at standard and elevated temperatures.

SUMMARY OF THE INVENTION

One aspect of the present invention is directed to compositions comprising fully or substantially hydrogenated block copolymers and various end-use applications thereof. The hydrogenated block copolymer is a flexible hydrogenated block copolymer, which comprises at least two distinct blocks of hydrogenated polymerized vinyl aromatic monomer, herein referred to as hydrogenated vinyl aromatic polymer blocks, and at least one block of hydrogenated polymerized conjugated diene monomer, herein referred to as hydrogenated conjugated diene polymer block, wherein the flexible fully or substantially hydrogenated copolymer is characterized by:

a) a weight ratio of hydrogenated conjugated diene polymer block to hydrogenated vinyl aromatic polymer block of greater than 40:60;

b) a total number average molecular weight ($Mn_t$) of from 30,000 to 150,000, wherein each hydrogenated vinyl aromatic polymer block (A) has a $Mn_a$ of from 5,000 to 45,000 and each hydrogenated conjugated diene polymer block (B) has a $Mn_b$ of from 12,000 to 110,000; and c) a hydrogenation level such that each hydrogenated vinyl aromatic polymer block has a hydrogenation level of greater than 90 percent and each hydrogenated conjugated diene polymer block has a hydrogenation level of greater than 95 percent.

Compositions comprising hydrogenated block copolymers having these Mn and hydrogenation characteristics can be transparent to light at visible wavelengths and are ideally suited for conventional manufacturing and fabrication technologies, while possessing an excellent balance of properties at both standard and elevated temperatures. It has been discovered that compositions comprising hydrogenated copolymers having both the high hydrogenation levels and Mn limitations, have superior properties and processability characteristics, compared to the hydrogenated copolymer compositions of the prior art. The combination of high glass transition temperature, low water absorption, and excellent melt processability makes these polymers and blends thereof, ideal candidates for many applications including fabricated articles, thermoformed articles, extruded articles, injection molded articles, fibers, films and the like.

DESCRIPTION OF THE PREFERRED EMBODIMENTS

Figure 1:
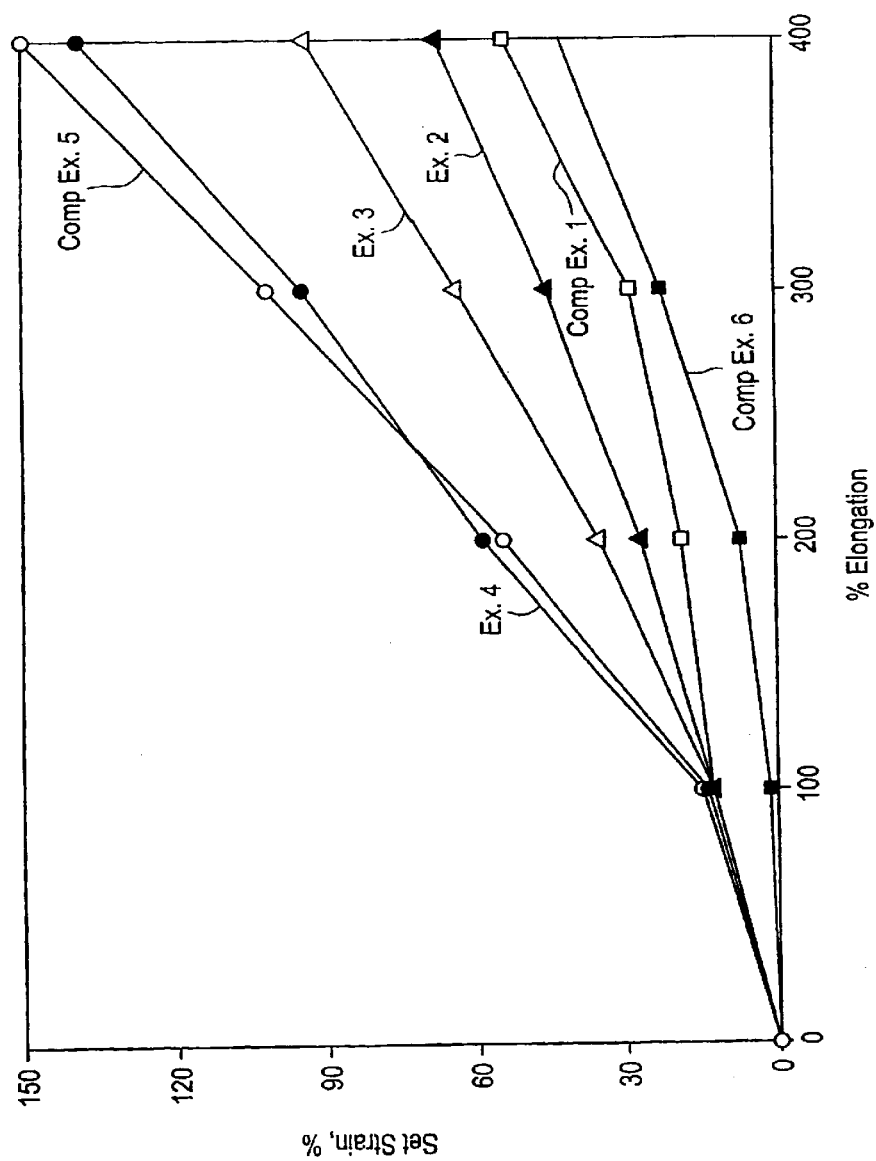
FIG. 1 is a plot of percent set strain versus percent elongation for Inventive Examples 2, 3 and 4, and Comparative Examples 1, 5 and 6.

One aspect of the present invention is directed to applications for flexible hydrogenated block copolymers. Hydrogenated block copolymers are prepared by hydrogenating a block copolymer produced from at least one vinyl aromatic monomer and at least one conjugated diene monomer.

The vinyl aromatic monomer is typically a monomer of the formula:

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The block copolymer can contain more than one specific polymerized vinyl aromatic monomer. In other words, the block copolymer can contain a polystyrene block and a poly-alpha-methylstyrene block. The hydrogenated vinyl aromatic block may also be a copolymer, wherein the hydrogenated vinyl aromatic portion is at least 50 weight percent of the copolymer.

The conjugated diene monomer can be any monomer having 2 conjugated double bonds. Such monomers include for example 1,3-butadiene, 2-methyl-1,3-butadiene, 2-methyl-1,3 pentadiene, isoprene and similar compounds, and mixtures thereof. The block copolymer can contain more than one specific polymerized conjugated diene monomer. In other words, the block copolymer can contain a polybutadiene block and a polyisoprene block.

The conjugated diene polymer block can be prepared from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. In some applications, the block copolymer can contain more than one conjugated diene polymer block, such as a polybutadiene block and a polyisoprene block. The conjugated diene polymer block may also be a copolymer of a conjugated diene, wherein the conjugated diene portion of the copolymer is at least 50 weight percent of the copolymer. The conjugated diene polymer block may also be a copolymer of more than one conjugated diene, such as a copolymer of butadiene and isoprene.

Other polymeric blocks may also be included in the hydrogenated block copolymers of the present invention.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. The separation of block segments can be detected by the presence of distinct glass transition temperatures. Microphase separation and block copolymers are widely discussed in "Block Copolymers-Designer Soft Materials", *PHYSICS TODAY*, February, 1999, pages 32–38.

The flexible hydrogenated block copolymers are defined as having a weight ratio of hydrogenated conjugated diene polymer block to hydrogenated vinyl aromatic polymer block of greater than 40:60; typically of greater than 40:60 to 95:5, preferably from 45:55 to 90:10, more preferably from 50:50 to 85:15 and most preferably from 60:40 to 80:20, based on the total weight of the hydrogenated conjugated diene and hydrogenated vinyl aromatic polymer blocks. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

The flexible hydrogenated block copolymers used in the present invention are produced by the hydrogenation of block copolymers including triblock, multi-block, tapered block, and star block copolymers such as SBS, SBSBS, SIS, SISIS, SISBS and the like (wherein S is polystyrene, B is polybutadiene and I is polyisoprene). The block copolymers contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone. In addition, blends of any of the aforementioned block copolymers can also be used as well as blends of the block copolymers with their hydrogenated homopolymer counterparts. In other words, a hydrogenated SBS block copolymer can be blended with a hydrogenated SBSBS block copolymer and/or a hydrogenated polystyrene homopolymer. It should be noted here that in the production of block copolymers, small amounts of residual diblock copolymers can be produced.

The total number average molecular weight ($Mn_t$) of the flexible hydrogenated block copolymers used in the present invention is typically from 30,000, preferably from 45,000, more preferably from 55,000 and most preferably from 60,000 to 150,000, typically to 140,000, generally to 135,000, preferably to 130,000, more preferably to 125,000, and most preferably to 120,000. The Mn, as referred to throughout the specification, is determined using gel permeation chromatography (GPC). The molecular weight of the hydrogenated block copolymer and properties obtained are dependent upon the molecular weight of each of the hydrogenated polymeric blocks.

Number average molecular weight (Mn) and weight average molecular weight (Mw) can both be used to describe the polymers described herein. Because these polymers tend to have very narrow molecular weight polydispersities, the difference between Mn and Mw will be minimal. The ratio of Mw to Mn is typically 1.1 or less. In fact, in some cases the number average molecular weight and the number average molecular weight will be virtually the same. Therefore, Mn can also be read as Mw throughout this application.

It should be noted that good properties are obtained at hydrogenated vinyl aromatic polymer molecular weights which are lower than the entanglement molecular weight of the hydrogenated vinyl aromatic polymer. The entanglement molecular weight of a polymer is associated with the chain length required for a given polymer to show a dramatic increase in melt viscosity due to chain entanglements. The entanglement molecular weights for many common polymers have been measured and reported in Macromolecules, 1994, Volume 27, page 4639. It is commonly observed for glassy polymers that maximum values of strength and toughness are achieved at about 10 times the entanglement molecular weight (see, for instance, Styrene Polymers in the Encyclopedia of Polymer Science and Engineering, 2nd edition, Volume 16, pages 62–71, 1989). The entanglement molecular weight is approximately 38,000 for hydrogenated polystyrene (polyvinylcyclohexane). We have determined that an optimum balance of properties and processability can be obtained at hydrogenated vinyl aromatic polymer block molecular weights (Mn) of 0.2 to 1.2 times the entanglement molecular weight of a hydrogenated vinyl aromatic polymer.

The flexible hydrogenated block copolymers will typically have hydrogenated vinyl aromatic polymer block $Mn_a$'s of from 6,000, preferably from 9,000, more preferably from 11,000, and most preferably from 12,000 to 45,000, preferably to 35,000, more preferably to 25,000 and most preferably to 20,000. The hydrogenated diene polymer block will typically have a $Mn_b$ from 12,000, preferably from 27,000, more preferably from 33,000 and most preferably from 36,000 to 110,000, preferably to 100,000, more preferably to 90,000 and most preferably to 80,000.

It is important to note that each individual block of the flexible hydrogenated block copolymer used in the present invention, can have its own distinct Mn. In other words, for example, two hydrogenated vinyl aromatic polymer blocks within the hydrogenated block copolymer may each have a different Mn.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154 which are herein incorporated by reference.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024) both of which are incorporated herein by reference. Additionally, soluble, homogeneous catalysts such those prepared from combinations of transition metal salts of 2-ethylhexanoic acid and alkyl lithiums can be used to fully saturate block copolymers, as described in *Die Makromolekulare Chemie*, Volume 160, pp. 291, 1972. The copolymer hydrogenation can also be achieved using hydrogen and a heterogeneous catalyst such as those described in U.S. Pat. No 5,352,744, U.S. Pat. No. 5,612,422 and U.S. Pat. No. 5,645,253 which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having average pore diameters in the range of 500 to 3,000 angstroms.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in Studies in Surface Science and Catalysis, "Successful Design of Catalysts" V. 44, pg. 146–158, 1989 and Applied Heterogeneous Catalysis pgs. 75–123, Institute Français du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.

Hydrogenated flexible block copolymers used in the present invention are also defined as being substantially or fully hydrogenated in that at least 90 percent of the aromatic rings of the block copolymer are hydrogenated, and may be referred to as substantially hydrogenated flexible block copolymers. The level of hydrogenation is preferably greater than 95 percent of the conjugated diene polymer block and greater than 90 percent of the vinyl aromatic polymer block segments, more preferably greater than 99 percent of the conjugated diene polymer block and greater than 95 percent of the vinyl aromatic polymer block segments, even more preferably greater than 99.5 percent of the conjugated diene polymer block and greater than 98 percent of the vinyl aromatic polymer block segments, and most preferably greater than 99.9 percent of the conjugated diene polymer block and 99.5 percent of the vinyl aromatic polymer block segments. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

Anionically polymerized block copolymers typically microphase separate into well-defined morphologies, with morphology dimensions typically ranging from 5 to 50 nanometers in size. Typical morphologies include a continuous matrix phase of one hydrogenated polymer with well-defined spheres, cylinders or gyroids of the minor phase hydrogenated polymer blocks dispersed within the matrix, and a lamellar cocontinuous phase, wherein both hydrogenated polymer blocks are in a continuous phase interspersed within each other. These different morphologies give rise to different physical properties. Hydrogenated block copolymers in which the hydrogenated conjugated diene polymer blocks are continuous are typically elastomeric, highly resilient materials. Conversely, materials in which the hydrogenated vinyl aromatic polymer block segments are the continuous phase are typically stiff, tough plastics. Hydrogenated block copolymers wherein both hydrogenated polymer blocks are cocontinuous tend to have intermediate properties.

In one embodiment, the composition comprises a hydrogenated block copolymer comprising less than 80 weight percent hydrogenated vinyl aromatic polymer blocks, based on the total weight of the hydrogenated block copolymer, and has an aromatic hydrogenation level of greater than 90 percent.

In another embodiment, the composition comprises a hydrogenated block copolymer of a vinyl aromatic and a conjugated diene, wherein the block copolymer is a pentablock copolymer comprising 3 blocks of hydrogenated vinyl aromatic polymer and two blocks of conjugated diene polymer. The hydrogenated pentablock copolymer comprises less than 80 weight percent hydrogenated vinyl aromatic polymer blocks, based on the total weight of the hydrogenated block copolymer, and has an aromatic hydrogenation level of greater than 90 percent.

Another aspect of the present invention relates to polymer blends of the flexible hydrogenated block copolymers.

Compositions comprising flexible hydrogenated block copolymers may additionally comprise at least one other natural or synthetic polymer. Suitable polymeric materials include, but are not limited to, hydrogenated vinyl aromatic homopolymers, other hydrogenated block copolymers, including hydrogenated styreneibutadiene or styrene/isoprene block copolymers, thermoplastic polyurethanes, polycarbonates (PC), polyamides, polyethers, poly/vinyl chloride polymers, poly/vinylidene chloride polymers, polyesters, polymers that contain lactic acid residuals, partially or non-hydrogenated block copolymers, thermoplastics such as styrene-butadiene block copolymers, polystyrene (including high impact polystyrene), acrylonitrile-butadiene-styrene (ABS) copolymers, styrene-acrylonitrile copolymers (SAN), ABS/PC compositions, polyethylene terephthalate, epoxy resins, ethylene vinyl alcohol copolymers, ethylene acrylic acid copolymers, polyolefin carbon monoxide interpolymers, chlorinated polyethylene, cyclic olefin copolymers (COC's), olefin copolymers (especially polyethylene copolymers such as ethylene-styrene interpolymers) and homopolymers (e.g., those made using conventional heterogeneous catalysts). Examples include polymers made by the process of U.S. Pat. No. 4,076,698, incorporated herein by reference.

In one embodiment, the composition additionally comprises a polyolefin elastomer or plastomer, especially a polyolefin elastomer or plastomer made using a single-site catalyst system (for example, a homogeneously branched ethylene polymer such as a substantially linear ethylene interpolymer or a homogeneously branched linear ethylene interpolymer).

Generally suitable polyolefins include, for example, polyethylene (ethylene homopolymer), ethylene/alpha-olefin interpolymers, alpha-olefin homopolymers, such as polypropylene (propylene homopolymer), alpha-olefin interpolymers, such as interpolymers of polypropylene and an alpha-olefin having at least 4 carbon atoms.

Representative polyolefins include, for example, but are not limited to, substantially linear ethylene polymers, homogeneously branched linear ethylene polymers, heterogeneously branched linear ethylene (including linear low density polyethylene (LLDPE), ultra or very low density polyethylene (ULDPE or VLDPE) medium density polyethylene (MDPE) and high density polyethylene (HDPE)), high pressure low density polyethylene (LDPE), ethylene/acrylic acid (EAA) copolymers, ethylene/methacrylic acid (EMAA) copolymers, ethylene/acrylic acid (EAA) ionomers, ethylene/methacrylic acid (EMAA) ionomers, ethylene/vinyl acetate (EVA) copolymers, ethylene/vinyl alcohol (EVOH) copolymers, polypropylene homopolymers and copolymers, ethylene/propylene polymers, ethylene/styrene interpolymers, graft-modified polymers (e.g., maleic anhydride grafted polyethylene such as LLDPE g-MAH), ethylene acrylate copolymers (e.g. ethylene/ethyl acrylate (EEA) copolymers, ethylene/methyl acrylate (EMA), and ethylene/methmethyl acrylate (EMMA) copolymers), polybutylene (PB), ethylene carbon monoxide interpolymer (e.g., ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO), chlorinated polyethylene and mixtures thereof.

Ethylene/styrene interpolymers are prepared by polymerizing i) ethylene or one or more alpha-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

Ethylene/styrene interpolymers can be substantially random, psuedo-random, random, alternately, diadic, triadic, tetradic or any combination thereof. That is, the interpolymer product can be variably incorporated and optionally variably sequenced. Preferred ethylene/styrene interpolymers are substantially random ethylene/styrene interpolymers.

The term "variably incorporated" as used herein refers to a ethylene/styrene interpolymer manufactured using at least two catalyst systems wherein during interpolymerization the catalyst systems are operated at different incorporation or reactivity rates. For example, the interpolymer product having a total styrene content of 36 weight percent is variably incorporated where one catalyst system incorporates 22 weight percent styrene and the other catalyst system incorporates 48 weight percent styrene and the production split between the two catalyst systems is 47/53 weight percentages.

"Pseudo-random" ethylene/styrene interpolymers are described in U.S. Pat. No. 5,703,187, the disclosure of which is incorporated herein in its entirety by reference.

"Random" interpolymers are those in which the monomer units are incorporated into the chain wherein there can exist various combinations of ordering including blockiness where either the aliphatic alpha-olefin monomer (A) or hindered vinylidene monomer (B) or both can be repeated adjacent to one another.

"Alternating" ethylene/styrene interpolymers are those in which the aliphatic alpha-olefin monomer (A) and hindered vinylidene monomer (B) occur in repeat alternate sequences on the polymer chain in atactic or stereospecific structures (such as isotactic or syndiotactic) or in combinations of the general formula $(AB)_n$ wherein n is an integer from 1 to 4000. The term "substantially random" as used herein in reference to ethylene/styrene interpolymers generally means that the distribution of the monomers of the interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Substantially random interpolymers do not contain more than 15 mole percent of the total amount of vinyl or vinylidene aromatic monomer in blocks of vinyl or vinylidene aromatic monomer of more than 3 units.

Preferably, the substantially random interpolymer is not characterized by a high degree (greater than 50 mol %) of either isotacticity or syndiotacticity. This means that in the carbon$^{-13}$ NMR spectrum of the substantially random interpolymer, the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" it is meant a substantially random interpolymer produced from the above-mentioned monomers.

Suitable α-olefin monomers which are useful for preparing the substantially random ethylene/styrene interpolymer include, for example, α-olefin monomers containing from about 2 to about 20, preferably from about 2 to about 12, more preferably from about 2 to about 8 carbon atoms. Preferred such monomers include ethylene, propylene, butene-1,4-methyl-1-pentene, hexene-1 and octene-1. Most preferred are ethylene or a combination of ethylene with $C_3$–$C_8$ α-olefins. These α-olefins do not contain an aromatic moiety.

Suitable vinyl or vinylidene aromatic monomers which can be employed to prepare the substantially random ethylene/styrene interpolymer include, for example, those represented by the following formula:

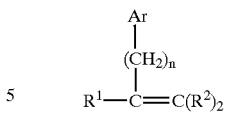

wherein $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; Ar is a phenyl group or a phenyl group substituted with from about 1 to about 5 substituents selected from the group consisting of halo, $C_{1-4}$-alkyl, and $C_{1-4}$-haloalkyl; and n has a value from zero to about 4, preferably from zero to about 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers" in reference to substantially random ethylene/styrene interpolymers, it is meant addition polymerizable vinyl or vinylidene monomers corresponding to the formula:

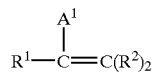

wherein $A^1$ is a sterically bulky, aliphatic or cycloaliphatic substituent of up to 20 carbons, $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; or alternatively $R^1$ and $A^1$ together form a ring system.

By the term "sterically bulky" as used in reference to substantially random ethylene/styrene interpolymers it is meant that the monomer bearing this substituent is normally incapable of addition polymerization by standard Ziegler-Natta polymerization catalysts at a rate comparable with ethylene polymerizations.

α-Olefin monomers containing from about 2 to about 20 carbon atoms and having a linear aliphatic structure such as ethylene, propylene, butene-1, hexene-1 and octene-1 are not considered to be sterically hindered aliphatic monomers. With regard to substantially random ethylene/styrene interpolymer, preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexane and substituted cyclohexenes, and 5-ethylidene-2-norbornene. Especially suitable are 1-, 3-, and 4-vinylcyclohexene.

The substantially random ethylene/styrene interpolymer usually contains from about 5 to about 65, preferably from about 5 to about 55, more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of at least one aliphatic α-olefin having from about 2 to about 20 carbon atoms.

Other optional polymerizable ethylenically unsaturated monomer(s) for substantially random ethylene/styrene interpolymers include strained ring olefins such as norbornene and $C_1$–$C_{10}$-alkyl or $C_6$–$C_{10}$-aryl substituted norbornene, with an exemplary substantially random interpolymer being ethylene/styrene/norbornene.

A preferred polymeric material for blending with a flexible hydrogenated block copolymer is a polyolefin elastomer or plastomer characterized as having a DSC crystallinity of less than 45 weight percent, preferably less than 30 weight percent, more preferably less than or equal to 20 weight percent, and most preferably less than or equal 16 percent.

The polyolefin elastomer or plastomer will typically be characterized as having a melt index of less than 1000 g/10 minutes, preferably less than 500 g/10 minutes, most preferably less than or equal to 50 g/10 minutes, as determined in accordance with ASTM D-1238, Condition 190° C./2.16 kilogram (kg). However, in certain embodiments, it will be desirable to utilize an ultra-low molecular weight polyolefin elastomer or plastomer. In particular, ultra-low molecular weight ethylene polymers, such as are disclosed in U.S. Pat. No. 6,054,544, may find utility in the practice of the claimed invention.

The ultra-low molecular weight ethylene polymers useful in the practice of the invention will be characterized as having a melt viscosity at 350° F. of less than 8200, preferably less than 6000, with melt viscosities at 350° F. of less than 600 centipoise being easily attained. The melt viscosity will be chosen based on the desired result. In particular, the lower the melt viscosity of the ultra-low molecular weight ethylene polymer, the more it will tend to reduce the overall viscosity of the compositions of the invention.

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F., with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

When an ultra-low molecular weight ethylene polymer is utilized, it will typically have a density of from 0.850 to 0.970 g/cm$^3$. The density employed will be a function of the end use application contemplated. For instance, when the ultra-low molecular weight ethylene polymer is intended as a wax substitute, densities greater than 0.910, preferably greater than 0.920 g/cm$^3$ will be appropriate. In contrast, when the polymer is intended as to impart some elastomeric characteristics to the composition, densities less than 0.900 g/cm$^3$, preferably less than 0.895 g/cm$^3$ will be appropriate. When the ultra-low molecular weight ethylene polymer is an interpolymer of ethylene and an aromatic comonomer, such as styrene, the density of the interpolymer will be less than 1.10 g/cm$^3$.

Also, preferably the polymeric material used for blending with the flexible hydrogenated block copolymer is characterized as having a percent permanent set of less than 75 at 23° C., preferably less than or equal 60 at 23° C., more preferably less than or equal to 30 at 23° C. and most preferably less than or equal to 15 at 23° C. and 38° C. and 200 percent strain when measured at a 2 mil thickness using an Instron tensiometer; or preferably a percent set elongation of less than or equal to 25, more preferably 20, most preferably 15 at 23° C. and 100 percent strain.

The term "polymer", as used herein, refers to a polymeric compound prepared by polymerizing monomers, whether of the same or a different type. As used herein, generic term "polymer" embraces the terms "homopolymer," "copolymer," "terpolymer" as well as "interpolymer."

The term "interpolymer", as used herein refers to polymers prepared by the polymerization of at least two different types of monomers. As used herein the generic term "interpolymer" includes the term "copolymers" (which is usually employed to refer to polymers prepared from two different monomers) as well as the term "terpolymers" (which is usually employed to refer to polymers prepared from three different types of monomers).

The term "homogeneously branched ethylene polymer" is used herein in the conventional sense to refer to an ethylene interpolymer in which the comonomer is randomly distributed within a given polymer molecule and wherein substantially all of the polymer molecules have the same ethylene to comonomer molar ratio. The term refers to an ethylene interpolymer that are manufactured using so-called homogeneous or single-site catalyst systems known in the art such Ziegler vanadium, hafnium and zirconium catalyst systems and metallocene catalyst systems e.g., a constrained geometry catalyst systems which is further described herein below.

Homogeneously branched ethylene polymers for use in the present invention can be also described as having less than 15 weight percent, preferably less than 10 weight percent, more preferably less than 5 weight percent and most preferably zero (0) weight percent of the polymer with a degree of short chain branching less than or equal to 10 methyls/1000 carbons. That is, the polymer contains no measurable high density polymer fraction (e.g., there is no fraction having a density of equal to or greater than 0.94 g/cm$^3$), as determined, for example, using a temperature rising elution fractionation (TREF) technique and infrared or 13C nuclear magnetic resonance (NMR) analysis.

Preferably, the homogeneously branched ethylene polymer is characterized as having a narrow, essentially single melting TREF profile/curve and essentially lacking a measurable high density polymer portion, as determined using a temperature rising elution fractionation technique (abbreviated herein as "TREF").

The composition distribution of an ethylene interpolymer can be readily determined from TREF as described, for example, by Wild et al., Journal of Polymer Science, Poly. Phys. Ed., Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985).

The composition (monomer) distribution of the interpolymer can also be determined using $^{13}C$ NMR analysis in accordance with techniques described in U.S. Pat. No. 5,292,845; U.S. Pat. No. 4,798,081; U.S. Pat. No. 5,089,321, incorporated here in by reference, and by J. C. Randall, *Rev. Macromol. Chem. Phys.*, C29, pp. 201–317 (1989).

In analytical temperature rising elution fractionation analysis (as described in U.S. Pat. No. 4,798,081 and abbreviated herein as "ATREF"), the film or composition to be analyzed is dissolved in a suitable hot solvent (e.g., trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD) or composition distribution (CD) curve, since it indicates how evenly the comonomer (e.g., octene) is distributed throughout the sample in that as elution temperature decreases, comonomer content increases. The refractive index detector provides the short chain distribution information and the differential viscometer detector provides an estimate of the viscosity average molecular weight. The composition distribution and other compositional information can also be determined using crystallization analysis fractionation such as the CRYSTAF fractionalysis package available commercially from PolymerChar, Valencia, Spain.

Preferred homogeneously branched ethylene polymers (such as, but not limited to, substantially linear ethylene polymers) have a single melting peak between –30 and 150° C., as determined using differential scanning calorimetry (DSC), as opposed to traditional Ziegler polymerized heterogeneously branched ethylene polymers (e.g., LLDPE and ULDPE or VLDPE) which have two or more melting points.

The single melting peak is determined using a differential scanning calorimeter standardized with indium and deionized water. The method involves about 5–7 mg sample sizes, a "first heat" to about 180° C. which is held for 4 minutes, a cool down at 10° C./min. to –30° C. which is held for 3 minutes, and heat up at 10° C./min. to 150° C. provide a "second heat" heat flow vs. temperature curve from which the melting peak(s) is obtained. Total heat of fusion of the polymer is calculated from the area under the curve.

The homogeneously branched ethylene polymers for use in the invention can be either a substantially linear ethylene polymer or a homogeneously branched linear ethylene polymer.

The term "linear" as used herein means that the ethylene polymer does not have long chain branching. That is, the polymer chains comprising the bulk linear ethylene polymer have an absence of long chain branching, as in the case of traditional linear low density polyethylene polymers or linear high density polyethylene polymers made using Ziegler polymerization processes (e.g., U.S. Pat. No. 4,076,698 (Anderson et al.)), sometimes called heterogeneous polymers. The term "linear" does not refer to bulk high pressure branched polyethylene, ethylene/vinyl acetate copolymers, or ethylene/vinyl alcohol copolymers which are known to those skilled in the art to have numerous long chain branches.

The term "homogeneously branched linear ethylene polymer" refers to polymers having a narrow short chain branching distribution and an absence of long chain branching. Such "linear" uniformly branched or homogeneous polymers include those made as described in U.S. Pat. No. 3,645,992 (Elston) and those made using so-called single site catalysts in a batch reactor having relatively high ethylene concentrations (as described in U.S. Pat. No. 5,026,798 (Canich) or in U.S. Pat. No. 5,055,438 (Canich)) or those made using constrained geometry catalysts in a batch reactor also having relatively high olefin concentrations (as described in U.S. Pat. No. 5,064,802 (Stevens et al.) or in EP 0 416 815 A2 (Stevens et al.)).

Typically, homogeneously branched linear ethylene polymers are ethylene/α-olefin interpolymers, wherein the a-olefin is at least one $C_3$–$C_{20}$ α-olefin (e.g., propylene, 1-butene, 1-pentene, 4-methyl-1-pentene, 1-hexene, 1-octene and the like) and preferably the at least one $C_3$–$C_{20}$ α-olefin is 1-butene, 1-hexene or 1-octene. Most preferably, the ethylene/α-olefin interpolymer is a copolymer of ethylene and a $C_3$–$C_{20}$ α-olefin, and especially an ethylene/$C_4$–$C_8$ α-olefin copolymer such as an ethylene/1-octene copolymer, ethylene/1-butene copolymer, ethylene/1-pentene copolymer or ethylene/1-hexene copolymer.

Suitable homogeneously branched linear ethylene polymers for use in the invention are sold under the designation of TAFMER™ by Mitsui Chemical Corporation and under the designations of EXACT™ and EXCEED™ resins by Exxon Chemical Company.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

The term "bulk polymer" as used herein means the polymer which results from the polymerization process as a mixture of polymer molecules and, for substantially linear ethylene polymers, includes molecules having an absence of long chain branching as well as molecules having long chain branching. Thus a "bulk polymer" includes all molecules formed during polymerization. It is understood that, for the substantially linear polymers, not all molecules have long chain branching, but a sufficient amount do such that the average long chain branching content of the bulk polymer positively affects the melt rheology (i.e., the shear viscosity and melt fracture properties) as described herein below and elsewhere in the literature.

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using $^{13}$C nuclear magnetic resonance (NMR) spectroscopy and to a limited extent, e.g. for ethylene homopolymers, it can be quantified using the method of Randall, (*Rev. Macromol.Chem. Phys.*, C29 (2&3), p. 285–297 (1989)). However as a practical matter, current $^{13}$C nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional $^{13}$C nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation LCB=b/M$_w$ wherein b is the weight average number of long chain branches per molecule and M$_w$ is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, including ethylene/1-octene interpolymers are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.,* 17, 1301 (1949) and Rudin, A., *Modern Methods of Polymer Characterization*, John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is indeed a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of Log(I$_2$, melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the empirical effect of the presence of long chain branching is manifested as enhanced rheological properties which are quantified and expressed in terms of gas extrusion rheometry (GER) results and/or melt flow, I$_{10}$/I$_2$, increases.

The substantially linear ethylene polymers used in the present invention are a unique class of compounds that are further defined in U.S. Pat. No. 5,272,236, application Ser. No. 07/776,130, filed Oct. 15, 1991; U.S. Pat. No. 5,278,272, application Ser. No. 07/939,281, filed Sep. 2, 1992; and U.S. Pat. No. 5,665,800, application Ser. No. 08/730,766, filed Oct. 16, 1996, each of which is incorporated herein by reference.

Substantially linear ethylene polymers differ significantly from the class of polymers conventionally known as homogeneously branched linear ethylene polymers described above and, for example, by Elston in U.S. Pat. No. 3,645,992. As an important distinction, substantially linear ethylene polymers do not have a linear polymer backbone in the conventional sense of the term "linear" as is the case for homogeneously branched linear ethylene polymers.

Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698) in that substantially linear ethylene interpolymers are homogeneously branched polymers. Further, substantially linear ethylene polymers also differ from the class of heterogeneously branched ethylene polymers in that substantially linear ethylene polymers are characterized as essentially lacking a measurable high density or crystalline polymer fraction as determined using a temperature rising elution fractionation technique.

The substantially linear ethylene elastomers and plastomers for use in the present invention is characterized as having (a) melt flow ratio, I$_{10}$/I$_2 \geq 5.63$, (b) a molecular weight distribution, M$_w$/M$_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an I$_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30° and 150° C., and (e) a density less than or equal to 0.865 g/cm³.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977) and in *Rheometers for Molten Plastics* by John Dealy, published by Van Nostrand Reinhold Co. (1982) on pp. 97–99.

The processing index (PI) is measured at a temperature of 190° C., at nitrogen pressure of 2500 psig (17.2 MPa) using a 0.0296 inch (752 micrometers) diameter (preferably a 0.0143 inch diameter die for high flow polymers, e.g. 50–100 $I_2$ melt index or greater), 20:1 L/D die having an entrance angle of 180°. The GER processing index is calculated in millipoise units from the following equation:

$$PI = 2.15 \times 10^6 \text{ dyne/cm}^2 / (1000 \times \text{shear rate}),$$

where: $2.15 \times 10^6$ dyne/cm² is the shear stress at 2500 psi (17.2 MPa), and the shear rate is the shear rate at the wall as represented by the following equation:

$$32 \, Q'/(60 \text{ sec/min})(0.745)(\text{Diameter} \times 2.54 \text{ cm/in})^3, \text{ where:}$$

Q' is the extrusion rate (gms/min), 0.745 is the melt density of polyethylene (gm/cm³), and Diameter is the orifice diameter of the capillary (inches).

The PI is the apparent viscosity of a material measured at apparent shear stress of $2.15 \times 10^6$ dyne/cm².

For substantially linear ethylene polymers, the PI is less than or equal to 70 percent of that of a conventional linear ethylene polymer having an $I_2$, $M_w/M_n$ and density each within ten percent of the substantially linear ethylene polymer.

An apparent shear stress vs. apparent shear rate plot is used to identify the melt fracture phenomena over a range of nitrogen pressures from 5250 to 500 psig (36 to 3.4 MPa) using the die or GER test apparatus previously described. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than about $2.8 \times 10^6$ dyne/cm².

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear ethylene polymers used in the invention, the critical shear stress at onset of gross melt fracture is preferably greater than about $4 \times 10^6$ dyne/cm².

For the processing index determination and for the GER melt fracture determination, substantially linear ethylene polymers are tested without inorganic fillers and do not have more than 20 ppm (parts per million) aluminum catalyst residue. Preferably, however, for the processing index and melt fracture tests, substantially linear ethylene polymers do contain antioxidants such as phenols, hindered phenols, phosphites or phosphonites, preferably a combination of a phenol or hindered phenol and a phosphite or a phosphonite.

The molecular weights and molecular weight distributions are determined by gel permeation chromatography (GPC). A suitable unit is a Waters 150° C. high temperature chromatographic unit equipped with a differential refractometer and three columns of mixed porosity where columns are supplied by Polymer Laboratories and are commonly packed with pore sizes of $10^3$, $10^4$, $10^5$ and $10^6$ Å. For ethylene polymers, the unit operating temperature is about 140° C. and the solvent is 1,2,4-trichlorobenzene, from which about 0.3 percent by weight solutions of the samples are prepared for injection. Conversely, for the flexible hydrogenated block copolymers, the unit operating temperature is about 25° C. and tetrahydrofuran is used as the solvent. A suitable flow rate is about 1.0 milliliters/minute and the injection size is typically about 100 microliters For the ethylene polymers where used in the present invention, the molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a^* (M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$. Where $w_i$ is the weight fraction of the molecules with molecular weight $M_i$ eluting from the GPC column in fraction i and j=1 when calculating $M_w$ and j=−1 when calculating $M_n$.

For the at least one homogeneously branched ethylene polymer used in the present invention, the $M_w/M_n$ is preferably less than 3.5, more preferably less than 3.0, most preferably less than 2.5, and especially in the range of from about 1.5 to about 2.5 and most especially in the range from about 1.8 to about 2.3.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, especially when good extrusion processability is desired, the preferred ethylene polymer for use in the present invention is a homogeneously branched substantially linear ethylene interpolymer.

Suitable constrained geometry catalysts for use manufacturing substantially linear ethylene polymers include constrained geometry catalysts as disclosed in U.S. application Ser. No. 07/545,403, filed Jul. 3, 1990; U.S. application Ser. No. 07/758,654, filed Sep. 12, 1991; U.S. Pat. No. 5,132,380 (application Ser. No. 07/758,654); U.S. Pat. No. 5,064,802 (application Ser. No. 07/547,728); U.S. Pat. No. 5,470,993 (application Ser. No. 08/241,523); U.S. Pat. No. 5,453,410 (application Ser. No. 08/108,693); U.S. Pat. No. 5,374,696 (application Ser. No. 08/08,003); U.S. Pat. No. 5,532,394 (application Ser. No. 08/295,768); U.S. Pat. No. 5,494,874 (application Ser. No. 08/294,469); and U.S. Pat. No. 5,189,192 (application Ser. No. 07/647,111), the teachings of all of which are incorporated herein by reference.

Suitable catalyst complexes may also be prepared according to the teachings of WO 93/08199, and the patents issuing therefrom, all of which are incorporated herein by reference. Further, the monocyclopentadienyl transition metal olefin polymerization catalysts taught in U.S. Pat. No. 5,026,798, which is incorporated herein by reference, are also believed to be suitable for use in preparing the polymers of the present invention, so long as the polymerization conditions substantially conform to those described in U.S. Pat. No. 5,272,236; U.S. Pat. No. 5,278,272 and U.S. Pat. No. 5,665,800, especially with strict attention to the requirement of continuous polymerization. Such polymerization methods are also described in PCT/U.S. 92/08812 (filed Oct. 15, 1992).

The foregoing catalysts may be further described as comprising a metal coordination complex comprising a metal of groups 3–10 or the Lanthanide series of the Periodic Table of the Elements and a delocalize β-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Suitable cocatalysts for use herein include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584, the disclosure of which is incorporated herein by reference. Aluminoxanes can also be made as disclosed in U.S. Pat. No. 5,218,071; U.S. Pat. No. 5,086,024; U.S. Pat. No. 5,041,585; U.S. Pat. No. 5,041,583; U.S. Pat. No. 5,015,749; U.S. Pat. No. 4,960,878; and U.S. Pat. No. 4,544,762, the disclosures of all of which are incorporated herein by reference.

Aluminoxanes, including modified methyl aluminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties (e.g. PI or melt fracture), aqueous HCl is used to extract the aluminoxane from the polymer. Preferred cocatalysts, however, are inert, noncoordinating, boron compounds such as those described in EP 520732.

Substantially linear ethylene are produced via a continuous (as opposed to a batch) controlled polymerization process using at least one reactor (e.g., as disclosed in WO 93/07187, WO 93/07188, and WO 93/07189), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via the continuous solution, slurry, or gas phase polymerization in the presence of a constrained geometry catalyst, such as the method disclosed in EP 416,815-A. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (i.e., soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The substantially linear ethylene polymers used in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" as discussed above is used herein to indicate a copolymer, or a terpolymer, or the like, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-octene is especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

In one embodiment, the composition used in the present invention comprises at least one hydrogenated block polymer and at least one polypropylene polymer. Suitable polypropylene polymers for use in the invention, including random block propylene ethylene polymers, are available from a number of manufacturers, such as, for example, Montell Polyolefins and Exxon Chemical Company. At Exxon, suitable polypropylene polymers are supplied under the designations ESCORENE™ and ACHIEVE™.

Suitable poly lactic acid (PLA) polymers for use in the invention are well known in the literature (e.g., see D. M. Bigg et al., "Effect of Copolymer Ratio on the Crystallinity and Properties of Polylactic Acid Copolymers", ANTEC '96, pp. 2028–2039; WO 90/01521; EP 0 515203A; and EP 0 748846A2, the disclosures of each of which are incorporated herein by reference). Suitable poly lactic acid polymers are supplied commercially by Cargill Dow under the designation EcoPLA™.

Suitable thermoplastic polyurethane polymers for use in the invention are commercially available from The Dow Chemical Company under the designation PELLATHANE™.

Suitable polyolefin carbon monoxide interpolymers can be manufactured using well known high pressure free-radical polymerization methods. However, they may also be manufactured using traditional Ziegler-Natta catalysis and even with the use of so-called homogeneous catalyst systems such as those described and referenced herein above.

Suitable free-radical initiated high pressure carbonyl-containing ethylene polymers such as ethylene acrylic acid interpolymers can be manufactured by any technique known in the art including the methods taught by Thomson and Waples in U.S. Pat. No. 3,520,861 and by McKinney et al. in U.S. Nos. 4,988,781; 4,599,392; and 5,384,373, the disclosures of which are incorporated herein by reference.

Suitable ethylene vinyl acetate interpolymers for use in the invention are commercially available from various suppliers, including Exxon Chemical Company and E.I. du Pont de Nemours and Company.

Suitable ethylene/alkyl acrylate interpolymers are commercially available from various suppliers. Suitable ethylene/acrylic acid interpolymers are commercially available from The Dow Chemical Company under the designation PRIMACOR™. Suitable ethylene/methacrylic acid interpolymers are commercially available from E.I. du Pont de Nemours and Company under the designation NUCREL™.

Suitable polyethylene terephthalate polymers include LIGHTER™ available from The Dow Chemical Company.

Chlorinated polyethylene (CPE), especially chlorinated substantially linear ethylene polymers, can be prepared by chlorinating polyethylene in accordance with well known techniques. Preferably, chlorinated polyethylene comprises equal to or greater than 30 weight percent chlorine. Suitable chlorinated polyethylenes for use in the invention are commercially supplied by Dupont Dow Elastomers L.L.C. under the designation TYRIN®.

Suitable polycarbonates are commercially available from various suppliers, including The Dow Chemical Company under the designation CALIBRE®.

Suitable polyamids, such as nylon are commercially available from various suppliers, including ZYTEL™ available from DuPont, CAPRON™ available from Allied and ULTAMID™ available from BASF.

Suitable polyethers are commercially available from various suppliers, including ULTEM™ available from GE Plastics.

Suitable poly/vinyl choride polymers are commercially available from various suppliers, including ALPHA DURAL™ AND ALPHA available from Alpha Chemical and Plastics, UNICHEM™ available from Colorite Plastics, GEON™ available from B.F. Goodrich.

Suitable poly/vinylidene chloride polymers are commercially available from various suppliers, including SARAN™ available from The Dow Chemical Company.

Suitable polyesters are commercially available from various suppliers, including FIBERCORE™ available from American Cyanamid; AROPOL™ available from Ashland Chemical Company and COREZYN™ available from Interplastic.

Suitable non-hydrogenated styrene-butadiene block copolymers are commercially available from various suppliers, including Dexco under the designation Vector™. Additionally, partially hydrogenated block copolymers can also be used and are well known in the art. Such polymers are easily prepared using hydrogenation catalysts well known in the art. Partially hydrogenated block copolymers include block copolymers having up to 100 percent diene unsaturation and 0 to less than 90 percent aromatic hydrogenation.

Suitable styrenic polymers include syndiotactic and atactic polystyrenes and high impact polystyrene resins which are commercially available from various suppliers, including QUESTRA®, STYRON® and STYRON-A-TECH®, available from The Dow Chemical Company.

Suitable ABS resins are commercially available from various suppliers, including MAGNUM® available from The Dow Chemical Company.

Suitable ABS/PC compositions are commercially available from various suppliers, including PULSE® available from The Dow Chemical Company.

Suitable SAN copolymers are commercially available from various suppliers, including TYRIL® available from The Dow Chemical Company.

Suitable ethylene vinyl alcohol copolymers are commercially available from various suppliers, including-ELVANOL™ which is available from DuPont and EVA polymers available from Eval Company of America.

Suitable epoxy resins are commercially available from various suppliers, including D.E.R. resins and D.E.N. resins available from The Dow Chemical Company.

Suitable cyclic-olefin-polymers and copolymers are polymerized cycloolefin monomers exemplified by norbornene-type polymers such as are described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinyl-norbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. The substituents on the cycloolefin monomers can be any which do not poison or deactivate the polymerization catalyst. Examples of preferred monomers include but are not limited to dicyclopentadiene, methyltetracyclo-dodecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7] dodecene-4, (or ethyl-tetracyclododecene), 9-hexyl-tetracyclo-[6,2,1,13,6O2,7]dodecene-4,9-decyl-tetracyclo [6,2,1,13,6O2,7]dodecene-4,9-decyl-tetracyclo[6,2,1,13, 6O2,7]dodecene-4,9,10-dimethyl-tetracyclo[6,2,1,13,6O2, 7]dodecene-4,9-methyl-10-ethyl-tetracyclo[6,2,1,13,6O2,7] dodecene-4,9-cyclohexyl-tetracyclo [6,2,1,13,6O2,7] dodecene-4,9-chloro-tetracyclo[6,2,1,13,6O2,7]dodecene-4,9-bromo-tetracyclo[6,2,1,13,6O2,7]-dodecene-4,9-fluoro-tetracyclo[6,2,1,13,6O2,7]dodecene-4,9-isobutyl-tetracyclo-[6,2,1,13,6O2,7]dodecene-4, and 9,10-dichlorotetracyclo[6,2,1,13,6O2,7]-dodecene-4.

Polymers comprising two or more different types of cyclic olefin monomeric units are also suitable. For example, copolymers of methyltetracyclododecane (MTD) and methylnorbornene (MNB) are especially suitable. More preferably, the polymers comprise three or more different types of monomeric unites, e.g., terpolymers, including MTD, MNB and dicyclopentadiene (DCPD).

Additionally, hydrogenated vinyl aromatic homopolymers can be used in combination with the hydrogenated block copolymers. Hydrogenated vinyl aromatic homopolymers typically have high aromatic hydrogenation levels as well (greater than 80, preferably greater than 90 percent). Other hydrogenated vinyl aromatic/conjugated diene block copolymers can also be used, provided that it is a different polymer than the hydrogenated block copolymer selected in I).

Any polymeric material which will enhance the properties of a hydrogenated block copolymer or be enhanced by the presence of a hydrogenated block copolymer is useful in the compositions utilized in the present invention.

Optionally, compatibilizers may also be used in the polymer blend of the present invention. A compatibilizer typically contains a functional group which is compatible with the flexible hydrogenated block copolymer and an additional functional group which is compatible with the other synthetic or natural polymer. Compatibilizers are well known in the art and one skilled in the art would easily be able to recognize the type of compatibilizer suitable for the desired compositions, if needed. For example, a blend of a flexible hydrogenated block copolymer with a styrene-butadiene-styrene block copolymer or other styrenic polymer may additionally comprise a styrene-ethylenebutene-styrene block copolymer as a compatibilizer. Additionally, a blend of a flexible hydrogenated block copolymer with a polycarbonate may additionally comprise a polyamide-maleic anhydride grafted polyethylene as a compatibilizer The polymer blend composition typically contain from 0.5, generally from 1, preferably from 3, more preferably from 5 and most preferably from 10 to 99.5, generally to 99, preferably to 97, more preferably to 95 and most preferably to 90 weight percent of the flexible hydrogenated block copolymer, based on the total weight of the composition.

In one embodiment, the additional polymer comprises from 5, typically from 10, generally from 15, preferably from 25, more preferably from 30 and most preferably from 40 to 95, typically to 90, generally to 85, preferably to 75, more preferably to 70 and most preferably to 60 weight percent of the composition comprising the hydrogenated block copolymer.

In one embodiment of the present invention, the composition comprises more than one hydrogenated block copolymer. The composition may comprise a rigid hydrogenated block copolymer or another flexible hydrogenated block copolymer. A rigid hydrogenated block copolymer is defined as having at least two distinct blocks of hydrogenated vinyl aromatic polymer, and at least one block of hydrogenated conjugated diene polymer, and is further characterized by:

a) a weight ratio of hydrogenated conjugated diene polymer block to hydrogenated vinyl aromatic polymer block of 40:60 or less;

b) a total number average molecular weight ($Mn_t$) of from 30,000 to 150,000, wherein each hydrogenated vinyl aromatic polymer block (A) has a $Mn_a$ of from 6,000 to 60,000 and each hydrogenated conjugated diene polymer block (B) has a $Mn_b$ of from 3,000 to 30,000; and c) a hydrogenation level such that each hydrogenated vinyl aromatic polymer block has a hydrogenation level of greater than 90 percent and each hydrogenated conjugated diene polymer block has a hydrogenation level of greater than 95 percent.

The compositions of flexible hydrogenated block copolymer and additional polymeric material may be prepared by any suitable means known in the art such as, but not limited to, dry blending in a pelletized form in the desired proportions followed by melt blending in a screw extruder, Banbury mixer or the like. The dry blended pellets may be directly melt processed into a final solid state article by, for example, injection molding. Additionally, the compositions may be prepared by solution mixing the individual polymeric components.

Additives such as antioxidants (for example, hindered phenols such as, for example, Irganox® 1010), phosphites (for example, Irgafos® 168)), U. V. stabilizers, cling additives (for example, polyisobutylene), antiblock additives, slip agents, colorants, pigments, fillers, fire retardants, light and heat stabilizers, extension oils and the like, can also be included in the compositions of the present invention, to the extent that they do not interfere with the enhanced properties discovered by applicants. In-process additives, e.g. calcium stearate, water, and fluoropolymers may also be used for purposes such as for the deactivation of residual catalyst or for further improved processability.

In another aspect of the present invention, flexible hydrogenated block copolymers, or blends thereof can also be used in the form of aqueous dispersions for use in coatings and dipped articles. Such dispersions will comprised the hydrogenated block copolymer, optional blended polymers, water and surfactant(s). Such dispersions can be produced using conventional batch or continuous processes such as phase inversion or direct dispersion techniques, known to those skilled in the art.

Additionally, high internal phase ratio (HIPR)emulsions, as described in U.S. Pat. No. 5,539,021, incorporated herein by reference, can be produced by continuously merging into a disperser, in the presence of an emulsifying and a stabilizing amount of a surfactant, a continuous phase liquid stream having a flow rate R1, and a disperse phase liquid stream having a flow rate R2; mixing the merged streams with a sufficient amount of shear, with R2:R1 sufficiently constant, to form the HIPR emulsion without phase inversion or stepwise distribution of an internal phase into an external phase; wherein R2:R1 is in a range where the polydispersity of the high internal phase ratio emulsion is less than 2.

The continuous phase and disperse phase liquid streams are sufficiently immiscible with each other to be emulsifiable. In one aspect R2:R1 is defined by a range where the polydispersity of the particles of the HIPR emulsion is less than 2. The term polydispersity is used to denote the ratio of the volume average diameter and the number average diameter of the particles, or $D_v/D_n$.

Preferably R2:R1 is such that the polydispersity is less than 1.5, more preferably less than 1.2, and most preferably not greater than 1.1. The allowable variance of the rates of each stream depends, in part, on the nature of the disperse and continuous phases, and the dispe4rswers used to make the HIPR emulsion. Preferably this variance is not greater than 10, more preferably not greater than 5, and most preferably less than 1 percent. Preferably, the average particle size of the HIPR emulsion is less than about 2 microns, more preferably, less than 1 micron.

The continuous phase and the disperse phase are liquids that are sufficiently immiscible to form a stable emulsion in the presence of a sufficient quantity of a surfactant. The liquid may be neat, molten, or a solid or unpumpable liquid dissolved in a solvent.

Preferably, the continuous phase is aqueous and the disperse phase comprises the hydrogenated block copolymer, and optionally a solvent. Suitable solvents include those used in the production of the hydrogenation block copolymer as taught herein.

Suitable surfactants include anionic, cationic, nonionic, or combinations thereof. Generally, higher surfactant concentrations result in smaller diameter particles, but surfactant concentrations that are too high tend to deleteriously affect the properties of the final product made from the emulsion. Typically surfactant concentrations are in the range of 0.1, more preferably 0.5, and most preferably 2, to about 15, preferably to about 8, more preferably to about 6 and most preferably about 4 weight percent, based on the weight of the dispersed polymer. The surfactant may be added initially to either the continuous phase or the disperse phase prior to mixing of the two phases, or added separately to the mixing device as a third stream. The surfactant is preferably added initially with the disperse phase prior to mixing of the two phases.

Of particular interest are the class of surfactants comprising the alkali or amine fatty acid salts such as alkali metal oleates (sodium oleate), and stearates; polyoxyethylene nonionics; alkali metal lauryl sulfates, quaternary ammonium surfactants; alkali metal alkylbenzene sulfonates, such as sodium dodecylbenzene sulfonate; and alkali metal soaps of modified resins.

Typically the dispersion produced contains a concentration of dispersed phase in amounts up to about 60 percent solids in order to have viscosities that are reasonable for processing. Continuous processes, such as in U.S. Pat. No. 5,539,021 will produce higher solids concentrations, but are typically diluted before use.

Examples of continuous processes suitable for the formation of these aqueous dispersions include U.S. Pat. No. 4,123,403; U.S. Pat. No. 5,539,021 and U.S. Pat. No. 5,688,842, all of which are incorporated herein by reference.

A latex is prepared from an HIPR emulsion by combining the emulsion with a suitable amount of the liquid which constitutes the continuous phase liquid, or a liquid which is compatible with the continuous phase, but which does not interfere with the integrity of the particles. Where water is the continuous phase, the latex is prepared by adding water to the HIPR emulsion. More preferably, the latex is made in a continuous fashion by directing the HIPR emulsion and water through any suitable dilution unit, such as a centrifugal pump-head.

Flexible hydrogenated block copolymer compositions have various advantages including high strength, low modulus, and elastic recovery. The following end-use applications advantageously utilize such flexible hydrogenated block copolymers and blends thereof.

One embodiment of the present invention is related to films produced from a composition comprising a flexible hydrogenated block copolymer. The film typically has a thickness of less than 20 mils. Films include, but are not limited to mono and multilayer films as well as uniaxial, biaxial and multiaxial oriented films. Films can be made by a variety of methods including, but not limited to casting, blowing, laminating, solution casting, extruding, co-extruding with or without tie layers, calendering and from aqueous or cast dispersions. Such films include, but are not limited to, cast films such as those used in producing automotive lumbar bags, a transdermal patch, backing layer films, labels, medical bags, e.g. IV solution bags, blood bags and dialysis bags, and pharmaceutical blister packaging, glass laminate films; blown films such as those used in producing food packaging, e.g. meat-wrap films, and fabric laminates; solvent cast films or films from aqueous dispersions or emulsions, such as those used to produce medical gloves and the like.

Methods of producing films from polymeric materials are well known in the art and described in *Plastics Engineering Handbook* of the Society of the Plastics Industry, Inc., Fourth Edition, 1976, pages 156, 174, 180 and 183.

Another aspect of the present invention is related to sheet produced from a composition comprising a flexible hydrogenated block copolymer. Sheet typically has a thickness of 20 mils or more. Flexible hydrogenated block copolymer sheet can be used to produce products which include, but are not limited to, membranes, skins for automotive instrument and door panels or seats, roofing, geo-membranes, pond and pool liners, molded sheet such as rotational/slush molded sheet, laminated, extruded or coextruded sheet, mono or multi-layer sheet, coated sheet, capped sheet, structural sheet, multi-wall sheet, calendered sheet, and the like.

Methods of producing sheet from polymeric materials are well known in the art and include extrusion, and calendering, all of which are described in *Plastics Engineering Handbook* of the Society of the Plastics Industry, Inc., Fourth Edition, 1976, on pages 183, 348 and 357.

Additional applications for films and sheet include packaging, cap liners, disposable diapers, adult incontinent products and feminine napkins and hygiene products, single-use surgical gowns, drapes and covers, barrier films, specialty tapes, label and envelope applications, pond liners, grain storage, sandbags, vapor barriers, air infiltration barrier, house-wrap, concrete curing covers, abatement products, outdoor storage covers, export crate liners, in-plant partitions, salt and sand pile covers, barricade and warning tapes, flagging tapes, fumigation covers, steam sterilization film, shade and bloom control film, pipe wrap, geo-membrane liners and covers, manufactured housing films, oil field pit liners, enclosure films, transportation films, remediation liners and covers, under-slab vapor barriers, pond liners, erosion control covers, radon retarder films, floor and carpet films, daily and interim landfill covers, divider curtains, lead and asbestos abatement films, RV under-siding films, landfill caps, cap layers, outdoor covering, grain covers, fumigation covers, silage and hay covers, ceilings, stock pile covers, waste disposal liners, rail car covers, textile backsheet, surgical drapes, pouches and bags, stretch wrapping, signage such as vehicle graphics, bill boards and point of purchase displays, and other durable, long-term applications, graphic films, grocery and trash bags, medical films, artificial leather, flexible flooring components such as a calendered layer in a flooring application, food wraps, toothpaste tubes auto safety glass interlayer film, safety glass laminate film, medical packaging, retort packaging, oriented shrink film, soft shrink films, standup pouches, elastic masking films, reflective window films, tapes with directional properties, elastic medical drape films, tourniquets, cling layers in stretch cling films, scratch resistance films, biaxially oriented films, fringed headliners, greenhouse films, heavy gauge insulation bags, hot fill packaging applications, overhead transparency films, produce packaging, computer screen protection films, flat plate displacement panels, weather balloons and the like.

The films and sheet may be monolayer or multilayer in structure. Additional layers may be other polymeric materials including, but not limited to those polymers listed as possible polymers for blending with the flexible hydrogenated block copolymers.

Another aspect of the present invention is related to extruded, coextruded or laminated profiles produced from a composition comprising a flexible hydrogenated block copolymer. Such profiles include, but are not limited to, automotive profiles, weather-stripping, window profiles, gaskets, hoses, tubing (industrial, medical, automotive, food process and the like), pipes, wires, cable profiles, weather stripping, sliding door runners, edge protectors, packaging and transit protection, window systems, furniture (functional and decorative profiles), windows (ornamental transoms for optical design, wall-joining profiles, facing profiles), plastic lumber, siding (interior or exterior residential, commercial, vinyl siding replacement and other building and construction applications) sealing strips, medical tubing, hot water pipe, industrial pipe, rod, high heat wire and cable jacketing, belts and the like.

Methods of producing profiles from polymeric materials are well known in the art and described in *Plastics Engineering Handbook* of the Society of the Plastics Industry, Inc., Fourth Edition, 1976, page 191.

Another aspect of the present invention is related to coated articles produced using coatings comprising a flexible hydrogenated block copolymer. Flexible hydrogenated block copolymer coatings can be used to produce products which include, but are not limited to, coated polymeric materials, coated fabric, coated inorganic materials such as concrete, glass and the like, coated paper or cardboard, coated wood products, and coated metal products. Examples include carpet backing, awnings, shading fabric, indoor and outdoor sun screens, wall coverings, food packaging, microporous waterproof wovens, tent fabrics, and caravan extensions, garden furniture garments, safety and protective wovens, films, fibers, apparel, bandages, coated lenses, coated soft touch table tops and the like. The flexible hydrogenated block copolymer can also be used in paint formulations. Alternatively, coating products can be produced using a spin coating process, wherein the flexible hydrogenated block copolymer is spin coated onto a mold to produce an article; such as spin coating an optical media disc or spin coating onto an optical media disc. Additionally, dipped products can also be made using coatings of the hydrogenated block copolymer. In particular, dipped goods can be produced using aqueous dispersions of the hydrogenated block copolymer or blends thereof. Dipped goods include gloves, condoms, medical bags, angioplasty balloons, medical bellows, face masks, blood pressure cuffs, catheters, medical tubing, gaskets and o-rings, non-medical gloves, swim caps, tool handle grips, industrial caps and plugs, windshield wiper boots, toy balloons, toys, electrical parts, covers and gaskets."

Methods of coating with polymeric materials are well known in the art and include extrusion, solvent casting, and coating from aqueous dispersion/emulsions, all of which are described in *Plastics Engineering Handbook* of the Society of the Plastics Industry, Inc., Fourth Edition, 1976, on pages 185, and spin coating as described in U.S. Pat. Nos. 5,635, 114; 5,468,324; and 5,663,016, which are incorporated herein by reference.

Another aspect of the present invention is related to injection molded articles produced from a composition comprising a flexible hydrogenated block copolymer. Injection molded articles include, but are not limited to, automotive articles such as bumper systems, exterior trim, gaskets and seals, interior trim, industrial rubber goods, thin wall injection molded articles, co-injection molded or overmolded articles such as dual durometer items, e.g. brushes, handles and automotive interior components. Co-injection refers to the simultaneous injection of at least two polymeric materials. In the present invention, the co-injected materials typically include a rigid hydrogenated block copolymer, or other olefin, in combination with the flexible hydrogenated block copolymer. Other injection molded applications include major appliances (cavity seals, sumps, motor mounts, bumpers, vibration dampers, gaskets, seals, cushions, direct-drive wheels, fill tube connectors, door seals), portable and small appliances ( bumpers, feet, handles, grips, motor mounts, vibration dampers, wheels, casters, rollers, seals, grommets, caps, plugs, gaskets, spacers, stops), business and electronic equipment (bumpers, feet, cushions, supports, rollers, paper feed systems, platens, gaskets, protective covers, grommets, mounts, bellows, vibration isolators), footwear (molded-on soles, heels, and combination sole/heels), sporting goods (handles, grips, cushions, spacers, air supply components, washers, seals, cable hangers), toys, action figures, mechanical dolls (gears, cams, flexing components), hardware (wheels, treads, rollers, motor mounts, handles, shields, grips, pedals, pads, vibration dampers, accessory holders, tubing covers, isolators, nozzles), industrial equipment (wheels, casters, rollers, handles, connectors, grips, bellows, gaskets, bumpers, protective covers), oil and gas production (injection line components, gaskets, wipers, seals, packers), fluid delivery (emitters, caps, seals, gaskets, diaphragms, o-rings, pipe isolators, vibration dampers), architectural glazing (setting blocks, spacers, wedge gaskets, leaf seals, finned bulb seals, glazing bead systems, bulbs, weather strips), construction (road expansion joints, pipe seals, line connectors, pipe isolators), automotive (fascia, bumper end caps, rub strips, bumper covers, air dams, air deflectors, shelf mats, boots, body side molding, lens gaskets, sound deadeners, grommets, seals, washers, poppets, bellows, radio and accessory knobs), medical (stoppers, valves, syringes, closures, bottles, labware, gaskets), electrical (pressure switches, cable junction covers, transformer encapsulation, plugs, grommets, connectors, and cabinetry), plumbing, industrial, consumer goods, bushings, absorption pads, bumpers, wear stripping, shoe soles, belting, wear strips, cutting surfaces, gaskets, seals, bumpers, gears, scraper blades, mounts, holding fixtures, drive rolls, pinch rolls, lifter pads, sporting goods, valves and fittings (gaskets, butterfly liners, coated ball valves, coated gate valves, check valves, flappers, diaphragms, valve seat discs,), railroad (mounts, bumpers, vibration dampers, gaskets, check valves, seals caps), pumps (impellers, gaskets, liners, seals), face masks, diving equipment, housings, trays, breathing masks, lenses (contact) and the like.

Methods of injection molding with polymeric materials are well known in the art and are described in *Plastics Engineering Handbook* of the Society of the Plastics Industry, Inc., Fourth Edition, 1976, on page 83 and in *Injection Molding Handbook* by Rosato and Rosato, 1986, page 9.

Another aspect of the present invention is related to blow molded articles produced from a composition comprising a flexible hydrogenated block copolymer. Blow molded articles include, but are not limited to injection(stretch) or extrusion blow molded articles, automotive bellows and boots, water tank bladders, industrial bellows and boots, shoe bladders, containers of all kinds for the food, beverage, cosmetic, medical, pharmaceutical, and home products industries, toys, business machine panels, computers and business equipment, hollow industrial parts, boats, bumpers, bumper fascias, seat backs, center consoles, armrest and headrest skins, covers, door shells, housings, casings, or other type of enclosures for the machine and furniture industry, pressure vessels, dash boards, ducting, fluid reservoirs, automotive instrument panels, custom cases, toys, carboys, holding tanks, reservoirs, wheels, contour packaging, tool holders, spoilers and bumpers, floor heating elements, surf boards, motorbike carrier boxes, car-top carriers, air ducts, stadium seating, structural covers for copiers and duplicators, guards, double wall panels, coolant overflow jars for trucks and automobiles, drinking water storage tanks, flexible bellows, hoses, boots, sprayer tanks, toys, and tool cases.

Methods of blow molding with polymeric materials are well known in the art and are described in *Plastics Engineering Handbook* of the Society of the Plastics Industry, Inc., Fourth Edition, 1976, on page 326.

Another aspect of the present invention is related to rotational molded articles, which include playground equipment, storage and feed tanks, door liners, automotive interior covers (instrument panel skins and the like), gear-shift covers, shipping containers, business and recreational furniture, planters, trash containers, whirlpool tubs, light globes, boats, canoes, camper tops, toys (hobbyhorses, dolls, sandboxes, small swimming pools, and athletic balls), advertising display signs, racks, mannequins and the like, produced from a composition comprising a flexible hydrogenated block copolymer.

Methods of rotational molding and rotational/slush molding are described in *Plastics Engineering Handbook* of the Society of the Plastics Industry, Inc., Fourth Edition, 1976, page 348.

Another aspect of the present invention is related to pultruded articles produced from a composition comprising a flexible hydrogenated block copolymer. Pultruded articles are continuous, cross-sectional, composite, extruded profiles produced by extruding a polymer melt and continuous fiber, simultaneously, through the same profile die. Examples include, but are not limited to structural beams, reinforcement bar, barricades, composite pipe, automotive bumper moldings, concrete reinforcement, window/door lineals, wood reinforcement, glulam (laminated joists), electrical laminates and the like.

Methods of pultrusion with polymeric materials are well known in the art and are described in *Plastics Engineering Handbook* of the Society of the Plastics Industry, Inc., Fourth Edition, 1976, on page 47.

All end-use applications can be provided as monolayer or multilayer articles, wherein any layer comprises the hydrogenated block copolymer as described herein. Additional layers may be other polymeric materials including, but not limited to those polymers listed as possible polymers for blending with the flexible hydrogenated block copolymers.

Surprisingly, these highly hydrogenated flexible block copolymers are capable of making a wide range of transparent (translucent or opaque with colorants), low color, flexible films; profiles; sheets; coated, injection molded, blow molded and pultruded articles having excellent properties at standard and elevated temperatures. Flexibility is achieved without the use of plasticizers, and the copolymers offer low residuals and extractables, high strength, good thermal, radiation, and light resistance, resistance to polar chemicals, acids, and bases, retention of properties at elevated temperatures, and puncture resistance. By using more elastic copolymers, manufacturing can be achieved with very low moduli, high elongations, and low levels of permanent deformation. In addition, all of these copolymers can be processed without drying, are compatible with other polyolefins, and have low health, environmental and safety concerns.

The following examples are provided to further illustrate and illuminate the present invention but are not intended to limit the invention to the specific embodiments set forth.

EXAMPLES 1–9

In one evaluation, the effect of blending a flexible hydrogenated block polymer (HBCP) and a partially hydrogenated block polymer into an ethylene polymer is investigated. Table 1 lists the various blends investigated in this evaluation and includes the block polymer weight percentages and example designations. The ethylene polymer is a substantially linear ethylene interpolymer supplied by Dupont-Dow Elastomers under the designation ENGAGE™ EG8200. Lycra is also included in this evaluation as a control material. The various blends and control samples are tested for percent elongation and percent set strain by measuring the percent permanent set after a five-cycles at various levels of strain. To determine the percent permanent set, samples of 2 inch (5.1 cm) gauge length of Inventive Example 1 and comparative run 8 are tested using an Instron tensiometer. A cross-head speed of 10 inches(25.4 cm)/minute is used to provide a strain rate of 5 min-1. Each sample is stretched to a predefined strain (that is, stretched five elongations from 100% to 400% strain at 100% increments using a new sample for each increment) level and then unloaded by reversing the crosshead movement without any hold time in between the stretching and unloading. After five repeats of the same cycle (with no hold time in between the stretching and the unloading), each sample is loaded for a sixth time. The strain at which the load rises above zero is recorded as set strain. In this evaluation, except for Lycra which is tested at 140 denier, 70 denier fiber is used for the testing. The 70 denier fiber for each sample is made using a capillary rheometer as described above. Notably, fiber cannot be spun at 40 wt. % Kraton G1652.

The fibers were made from the blends under following conditions using a variable speed take-up roll:

INSTRON Capillary Rheometer for extrusion
Die diameter=1000 microns, L/D=20
Output rate=about 0.4 gm/min
Melt temperature=250–255° C.
fiber denier=about 70

Addition of the 20% HBCP into EG8200 did not significantly improve tenacity at break or elastic recovery of EG8200. However, addition of the 40% HBCP into EG8200 significantly improved tenacity at break and elastic recovery of EG8200. The difference in improvement between 20% and 40% addition of the HBCP resin is very significant which could not be predicted using a blending rule.

Figure 2:
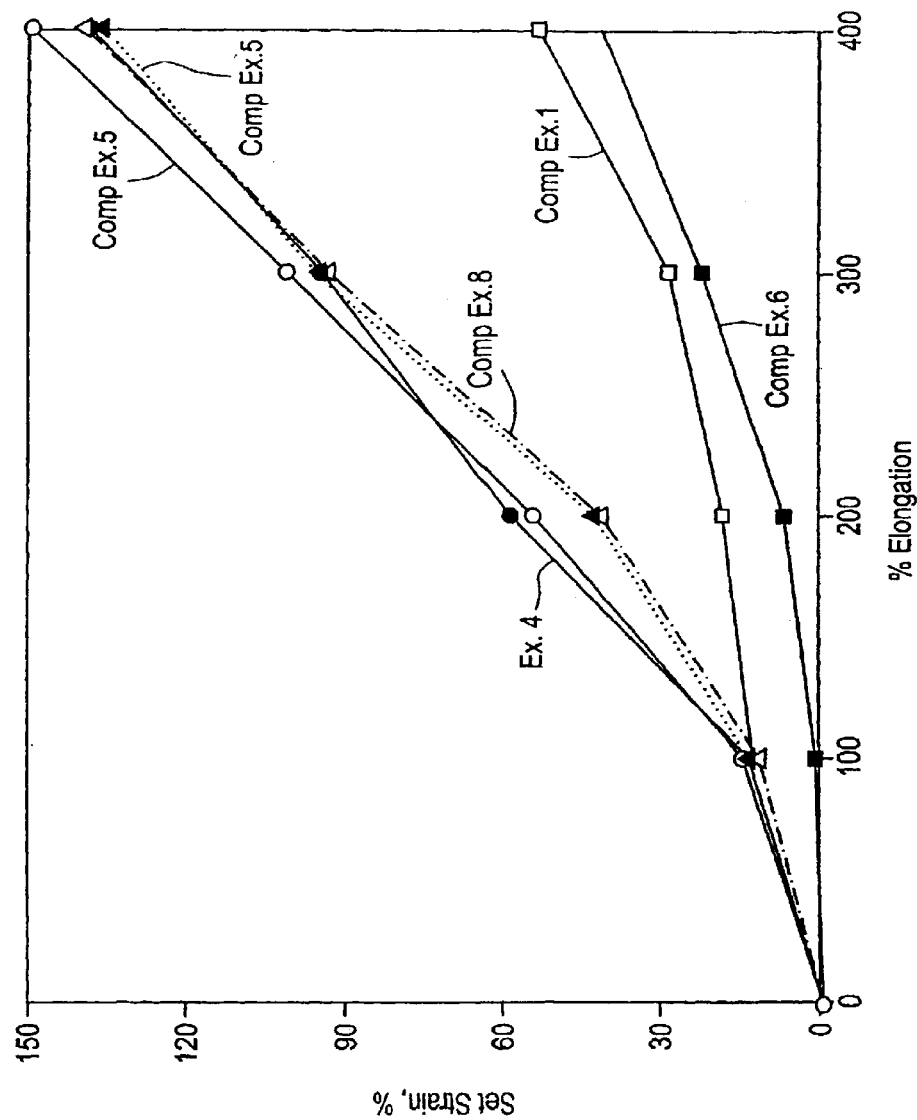
FIG. 2 is a plot of percent set strain versus percent elongation for Inventive Example 4, and Comparative Examples 1, and 5–8.
Figure 3:
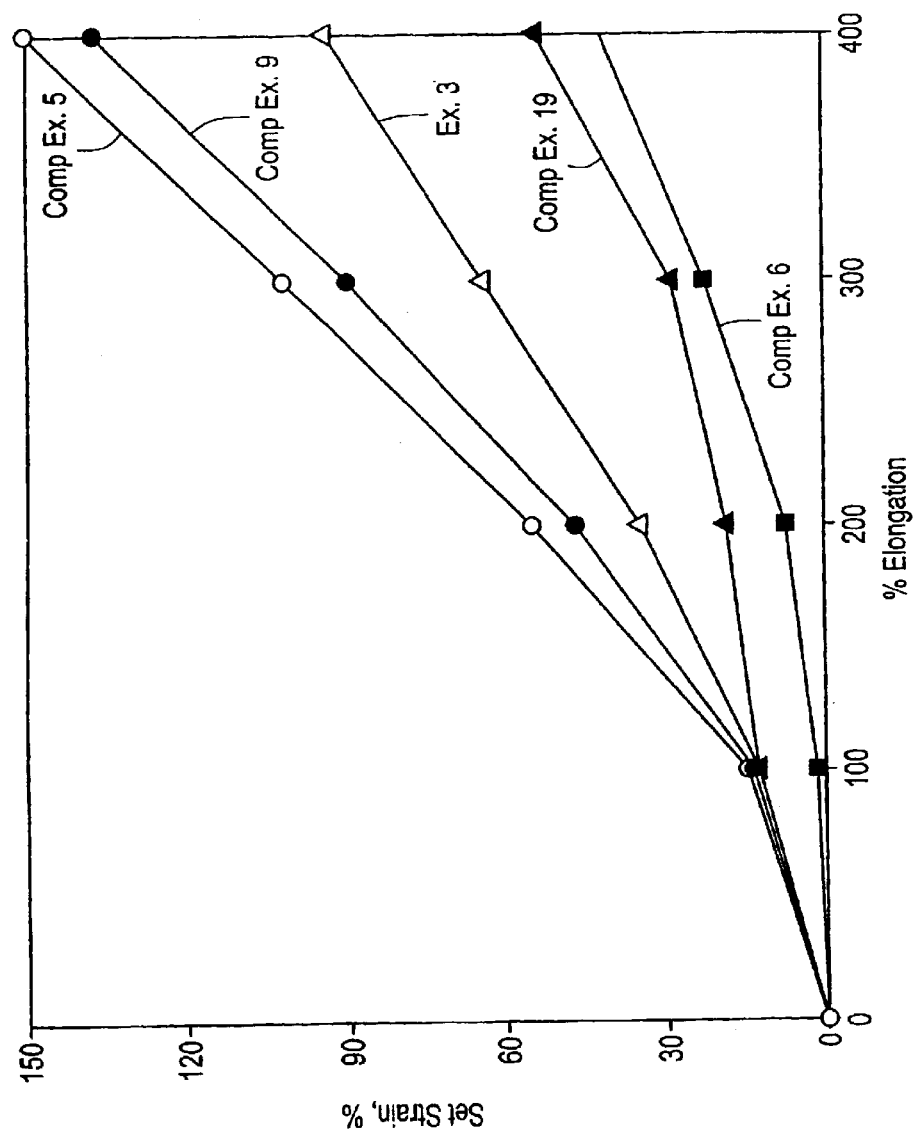
FIG. 3 is a plot of percent set strain versus percent elongation for Inventive Example 3 and Comparative Examples 1, 5–6, and 9.

FIGS. 1–3 show the results of this blend evaluation. Additive weight percent calculations from the results in these figures indicate that at 200%–300% strain, ethylene polymer blends containing greater than or equal to 40 weight percent hydrogenated block copolymer(HBCP) exhibit surprisingly better elasticity than is predictable from additive weight percent calculations. Also, the improvement in elasticity at greater than or equal to 40 weight percent is substantially better than is predictable from results at lower blend levels or from results at equivalent blend levels with partially hydrogenated block polymers(PHBCP).

All HBCP have an aromatic hydrogenation level of at least 95%.

TABLE 1

| Example | Wt. % HBCP[1] | Wt. % EG8200 | Wt. % PHBCP[2] |
|---|---|---|---|
| 1* | 100 | 0 | 0 |
| 2 | 60 | 40 | 0 |
| 3 | 40 | 60 | 0 |
| 4 | 20 | 80 | 0 |
| 5* | 0 | 100 | 0 |
| 6*Lycra ™ 100% | 0 | 0 | 0 |
| 7*(PHBCP = Kraton ™G1657) | 0 | 80 | 20 |
| 8*(PHBCP = Kraton ™G1652) | 0 | 80 | 20 |
| 9*(PHBCP = Kraton ™G1657) | 0 | 60 | 40 |

*Comparative examples
[1]HBCP is hydrogenated block copolymer (hydrogenated Styrene-butadiene-styrene) block copolymer having 66,000 Mn, 32 wt. % hydrogenated styrene, greater than 95% aromatic hydrogenation.
[2]PHBCP is partially hydrogenated block copolymer (diene only hydrogenated).

EXAMPLES 10–18

The following compositions are compounded on a twin screw extruder and pelletized.

| Example 10 | 90% Co-PP (703-35)(Propylene-ethylene copolymer available from The Dow Chemical Company) and 10% HBCP (triblock SBS of 90,000 Mn, 32 wt. % hydrogenated polystyrene and 40% 1,2 butadiene content. |
|---|---|
| Example 11 | 70% Co-PP (703-35) and 30% HBCP (triblock SBS of 90,000 Mn, 32 wt. % hydrogenated polystyrene and 40% 1,2 butadiene content. |
| Example 12 | 90% HDPE M6030 (high density polyethylene available from The Dow Chemical Company) and 10% HBCP (triblock SBS of 90,000 Mn, 32 wt. % hydrogenated polystyrene and 40% 1,2 butadiene content. |
| Example 13 | 70% HDPE M6030 30% HBCP (triblock SBS of 90,000 Mn, 32 wt. % hydrogenated polystyrene and 40% 1,2 butadiene content. |
| Example 14 | 70% LDPE 4005 (low density polyethylene available from The Dow Chemical Company) and 30% HBCP (triblock SBS of 90,000 Mn, 32 wt. % hydrogenated polystyrene and 40% 1,2 butadiene content. |
| Example 15 | 30% Engage ™ 81-80(polyethylene elastomer available from The Dow Chemical Company) and 70% HBCP (triblock SBS of 90,000 Mn, 32 wt. % hydrogenated polystyrene and 40% 1,2 butadiene content. |
| Example 16 | 10% Engage ™ 81-80 and 90% HBCP (triblock SBS of 90,000 Mn, 32 wt. % hydrogenated polystyrene and 40% 1,2 butadiene content. |
| Example 17 | 90% COC Topas ™ 5013 (cyclic olefin copolymer available from Ticona)and 10% HBCP (triblock SBS of 90,000 Mn, 32 wt. % hydrogenated polystyrene and 40% 1,2 butadiene content. |
| Example 18 | 70% COC Topas ™ 5013 and 30% HBCP (triblock SBS of 90,000 Mn, 32 wt. % hydrogenated polystyrene and 40% 1,2 butadiene content. |

Testing samples are injection molded. Properties are listed in TABLES 2,3 and 4. The following methods are used:

DTUL (Deflection temperature under load) is measured according to ASTM D648-82.

Vicat is measured according to ASTM D1525-87.

Flexural properties are measured according to ASTM D790-90.

ID(Instrumented Dart) is measured according to ASTM D3763-86.

Tensile properties are measured according to ASTM D638-90.

TABLE 2

| Ex. | Hardness | DTUL @264 ° C. | DTUL @66 ° C. | Vicat ° C. | Flex: Mod MPa | Flex: Str. MPa | CLTE cm/cm/° C. (×10 − 6) (−30 to 30° C.) |
|---|---|---|---|---|---|---|---|
| 10 | 58.7 | 50 | 79 | 143 | 1030 | 31 | 203 |
| 11 | 58.2 | 43 | 64 | 123 | 630 | 19 | 231 |
| 12 | 65.9 | 38 | 58 | 127 | 580 | 20 | 296 |
| 13 | 60.7 | 34 | 48 | 116 | 360 | 14 | 330 |
| 14 | 47.7 |  | 46 | 81 | 120 | 5 | 386 |
| 15 | 25.8 |  |  |  | 56 | 3 |  |
| 16 | 28.2 |  |  |  | 120 | 5 |  |
| 17 | 114.4 | 114 | 130 | 144 | 2810 | 98 | 112 |
| 18 | 87.7 | 108 | 128 | 143 | 2150 | 71 | 113 |

TABLE 3

| Ex. | ID (−40):Total Energy J | ID (−20):Total Energy J | ID (0):Total Energy J | ID (73): Total Energy J |
|---|---|---|---|---|
| 10 | 4 | 8 | 12 | 28 |
| 11 | 41 | 45 | 42 | 29 |
| 12 | 39 | 38 | 40 | 33 |
| 13 | 40 | 44 | 43 | 36 |
| 14 | 39 | 36 | 35 | 24 |
| 15 | 65 |  |  |  |
| 16 | 58 |  |  |  |
| 17 | 3 | 3 | 3 | 5 |
| 18 | 12 | 38 | 47 | 54 |

TABLE 4

| Ex. | Tensile: Yield MPa | Tensile: Ultimate Strength MPa | Tensile: Ultimate Elongation % | Tensile: Modulus MPa | Izod Unnotched Nonbreak J/m | Izod Notched- Nonbreak J/m |
|---|---|---|---|---|---|---|
| 10 | 21 | 15 | 4.6 | 1140 | 1551 | 0 |
| 11 | 14 | 20 | 6.5 | 660 | 1071 | 682 |
| 12 | 21 | 19 | 9.9 | 770 | 1396 | 986 |
| 13 | 14 | 20 | 12.1 | 430 | 901 | 768 |
| 14 | 6 | 13 | 14.7 | 120 | 373 | 330 |
| 15 | 2 | 6 | 478 | 48 | 0 | 69 |
| 16 | 4 | 6 | 426 | 250 | 0 | 101 |
| 17 | 52 | 51 | 2.8 | 2640 | 0 | 0 |
| 18 | 42 | 31 | 3.5 | 1940 | 1034 | 0 |

Compositions of hydrogenated block copolymers and other polymeric materials show excellent balance of physical properties.

EXAMPLES 19–21

Pellets of polymer as listed in TABLE 5 are mixed mechanically and compounded at a temperature of 250° C. on a Warner Pfleiderer 30 mm compounding extruder. The blends are then injection molded on a 28.5 metric tonne Arburg injection molding machine at a temperature of 210° C. and a mold temperature of 50° C. Tensile bars and discs are tested under ASTM methods as listed below:

| | |
|---|---|
| DTUL @66° C. | D648 |
| Vicat | D1525 |
| CLTE | D696 |
| Instrumented Impact | D3763 |
| Izod | D256 |
| Stress Relax and Set | D4649-87 |
| Shore A D2240(1 sec delay) | |
| Haze D1003 | |

TABLE 5

| Polymer | Comparative Example 19 | Example 20 | Example 21 |
|---|---|---|---|
| [1]Topas ™ 50131 (wt. %) | 100 | 90 | 70 |
| [2]HBCP (wt. %) | 0 | 10 | 30 |
| Properties | | | |
| DTUL (° C.) | 130 | 130 | 128 |
| Vicat (° C.) | 144 | 144 | 143 |
| CLTE (cm/cm/° C.) × 10 – 6 | 104 | 112 | 113 |
| Instrumented Impact (J) @ | | | |
| (−40) | 1.8 | 2.6 | 11.6 |
| (−20) | 2.3 | 3.1 | 37.6 |
| (0) | 2.7 | 3.4 | 47.2 |
| (73) | 2.7 | 4.5 | 53.8 |
| Izod (J/m) (Unnotched) | 165 | 593 | — |

[1]Topas ™ 5013 is a cyclic olefin copolymer available from Ticona.
[2]Hydrogenated block copolymer is a hydrogenated styrene-butadiene block copolymer of 90,000 Mn, 32 percent styrene block content, and 40 percent of butadiene is 1,2 configuration.

Blends of hydrogenated block copolymers show improved impact and izod properties.

EXAMPLES 22–30

For mixed blends, parts by weight of polymer as listed in TABLE 6 are mixed mechanically at 210° C. in a batch mixer (Haake Rheocord 90 torque rheometer with Rheomix 600 bowl, approximately 60 ml polymer volume) for approximately 10 minutes at 50 rpm rotor speed. For single component samples, samples are melt-homogenized on a Farrel 3 inch (7.62 cm) by 7 inch (17.8 cm) lab mill (steam heated at 155° C.) for 90 seconds and removed as a sheet. Test specimens are made by compression molding into thin sheets using a PHI hydraulic press set at 210° C. Specimens are 76 mm diameter circles of approximately 3.2 mm thickness for hardness and haze testing. Transmission is determined directly through a single layer. Specimens are cut in half and used as two layers for Shore A hardness testing. For physical strength and elasticity tests, specimens are approximately 75 mm wide by 115 m high by 0.94 mm thick. Results are listed in TABLE 6. Tests are completed according to ASTM methods listed previously.

TABLE 6

| EX. | EG 8200 | HBCP[1] | PHB CP[2] | Shore A Hardness | Ult. Tensile strength (MPa) | % elong. at break | Cycle I Stress Relaxation (% of peak value) | Cycle 1 Set (%) | Force at 100% Elong. (MPa) | % Haze |
|---|---|---|---|---|---|---|---|---|---|---|
| 22* | 100 | 0 | 0 | 64.7 | 15.1 | 919 | 13.7 | 52.6 | 2.71 | 42.5 |
| 23 | 75 | 25 | 0 | 68.2 | 25.6 | 706 | 12.8 | 30.8 | 2.64 | 44.0 |
| 24 | 50 | 50 | 0 | 69 | 28.3 | 544 | 12.0 | 16.8 | 2.96 | 39.7 |
| 25 | 25 | 75 | 0 | 71.2 | 31.0 | 538 | 11.4 | 10.2 | 2.70 | 34.7 |
| 26* | 0 | 100 | 0 | 81.0 | 41.5 | 481 | 11.3 | 10.6 | 2.92 | 20.4 |
| 27* | 75 | 0 | 25 | 69.7 | 22.9 | 738 | 13.5 | 34.9 | 2.76 | 99.4 |
| 28* | 50 | 0 | 50 | 70.3 | 31.7 | 638 | 13.1 | 22.3 | 2.96 | 99.4 |
| 29* | 25 | 0 | 75 | 75 | 39.2 | 588 | 12.5 | 14.1 | 2.66 | 91.6 |
| 30* | 0 | 0 | 100 | 78 | 47.3 | 494 | 14 | 9.5 | 3.79 | 18.8 |

*Comparative Examples
[1]HBCP is hydrogenated block copolymer (hydrogenated Styrene-butadiene-styrene) block copolymer having 63,000 Mn, 32 wt. % hydrogenated styrene, 40 percent of butadiene is 1,2 configuration
[2]PHBCP = Kraton ™ G1652

The blends of hydrogenated block copolymer have improved set and relaxation compared to the blends with partially hydrogenated block copolymer. The set and relaxation values are surprising in view of the lower values for the partially hydrogenated block copolymer neat sample compared to the hydrogenated block copolymer neat sample.

EXAMPLE 31
Preparation of Aqueous Dispersion

The hydrogenated block copolymer of styrene-butadiene-styrene (MW of 90,000, 32 wt. percent styrene, 40 percent 1,2 butadiene configuration) in the form of a solution of 40% solids in cyclohexane is warmed to 65° C. The heated sample is then transferred and loaded into a preheated disperser tank (65° C.). This solution is the disperse phase. The disperse phase is pumped from the tank continuously through an arm of a 0.5" (1.27 cm) i.d. stainless steel tube fitted to a T, at a constant rate of 31 g/min. Concurrently, surfactant, sodium oleate (43 weight % in a solution of 2:1(v/v) Ethanol/Water) is pumped through an arm of 0.125" (0.32 cm) stainless steel tubing fitted to the T, at a constant rate of at 1.1 ml/min. Upon exiting, the merged streams are mixed through a 0.5"(1.27 cm) diameter static mixer. The mixed stream is combined with water at flow rates ranging from 0.9–5.0 mL/min. through a second T fitting. The combined disperse phase, surfactant, and water are mixed together under conditions of shear using an in-line stator rotor mixer (E. T. Oakes) operating at 500–800 rpm. This concentrated emulsion is diluted with additional water in a second inline mixer and the particle size and polydispersity are measured using a Coulter LS-230 light scattering particle size analyzer. The solvent is removed from the resultant dispersion by rotary evaporation, and particle size and polydispersity are measured again, showing substantially the same results. The solids content is adjusted to approximately 50–55% by the removal of water in vacuo. The final volume average particle size of a 51% solids dispersion is 0.377 μm (polydispersity, $D_v/D_n$=1.17).

TABLE 7

| Sample | Particle Size (μm) | % Solids |
|---|---|---|
| A | 0.377 | 51.3 |
| B | 0.377 | 51.4 |

EXAMPLE 32
Preparation of Coagulated Film

A film is prepared by a coagulation process by heating a steel/porcelain (or etched glass) plate (7"×7"×1/16") (17.8× 17.8×0.16 cm) in an oven until it reaches a temperature between 100 to 120° F. (38–49° C.). The plate is then dipped into a 20 percent solution of calcium nitrate in 1:1 by weight of water and methanol which also includes about 1 wt % of a ethoxylated octylphenol surfactant. The plate is then placed into an oven at 230° F. (110° C.) for approximately 15 minutes to form a very thin film of calcium nitrate on the plate. The plate is allowed to cool to 105° F. (40° C.) and then dipped into the polymer dispersion of Sample A diluted to 25% solids with deionized water and removed (total dwell time is approximately 15 to 20 sec). The plate is held for 5 minutes at room temperature to allow the film to generate enough gel strength, followed by leaching in a water bath at 115° F. (46° C.) for 10 minutes. Both sides of the plate are then sprayed with water at 115° F. (40° C.) for two additional minutes. The plate is then kept in a forced air oven at 230° F. (110° C.) for 5 to 10 minutes and then annealed 302° F. (150° C.) for 15 minutes, followed by cooling to ambient temperature. A continuous polymer film is peeled from the substrate with an overall length=4.5"(11.4 cm), width of narrow section=0.25"(0.64 cm), and gauge length=1.31"(3.3 cm).

EXAMPLE 33
Preparation of Glove

A glove is manufactured using a ceramic glove mold, baths containing calcium nitrate, an aqueous dispersion, and distilled water, and a small laboratory oven. The material used was a 20% aqueous dispersion of a fully hydrogenated styrene-butadiene-styrene copolymer with a molecular weight of 100,000 (10,000 polystyrene end blocks and 80,000 butadiene mid-block) and low levels of crystallinity in the mid-block. To manufacture the films, the ceramic glove mold is dipped in a 30% calcium nitrate bath, followed by a bath containing the aqueous dispersion bath, and then the distilled water bath. The glove mold is placed in an oven at 140° C. for 10 minutes, allowed to cool, and the glove removed from the mold. The glove produced is elastomeric, transparent, with high tensile strength and elongation, and low set.

EXAMPLE 34

Elastomeric tubing is successfully extruded using a 1.5" (3.8 cm) Killion single screw extruder with 24/1 L/D Barr ET screw, a gear pump, and an 8 mm OD mandrel (6 mm ID) die. The material extruded is a fully hydrogenated styrene-butadiene-styrene copolymer with a molecular weight of 100,000 (10,000 polystyrene end blocks and 80,000 butadiene mid-block) and little crystallinity in the mid-block. The tubing produced is elastomeric, transparent, kink resistant, with high tensile strength, good thermal properties and low set.

EXAMPLE 35

Slush molded films are successfully produced using a small vacuum drying oven and an aluminum plate. The material that is slush molded is a fully hydrogenated styrene-butadiene-styrene copolymer with a molecular weight of 66,000 (10,500 polystyrene end blocks and 45,000 butadiene mid-block) with little crystallinity in the mid-block. The polymer is first ground to a powder, then placed on the metal plate, and inserted into the oven at a temperature of 220° C. for a period of 10 minutes. The plate is removed from the oven, allowed to cool, and the film is removed. The films produced are elastomeric, transparent, abrasion resistant, with high tensile strength, good thermal properties and low set.

EXAMPLE 36

A hydrogenated polymer having a weight ratio of hydrogenated conjugated diene polymer block to hydrogenated vinyl aromatic block of 25:75 and having a block structure of SBS and where the total average molecular weight ($Mn_t$) is 55,000 is blended with a hydrogenated polymer having a weight ratio of hydrogenated conjugated diene polymer block to hydrogenated vinyl aromatic block of 68:32 and having a block structure of SBS and where the total average molecular weight ($Mn_t$) is 66,000 in a Brabender Plasticoder at 220° C. for 1 to 2 minutes and the resulting blend is pressed into film using a Platen Press at a temperature of 230° C. for not more than minute and cooled.

The properties of the Platen Pressed films are shown in TABLE 8.

TABLE 8

| Polymer 25:75 | Polymer 68:32 | Tensile Yield (MPa) | Ultimate Tensile (MPa) | % Elong. | Tensile Toughness (MPa) | 1% Secant Modulus (MPa) | 2% Secant Modulus (MPa) |
|---|---|---|---|---|---|---|---|
| 100 | 0 | To brittle | To brittle | To brittle | To brittle | To brittle | To brittle |
| 62.5 | 37.5 | 20.7 | 30.0 | 303 | 59.9 | 863.9 | 787.4 |
| 50 | 50 | 15.2 | 24.9 | 299 | 50.5 | 672.3 | 608.5 |
| 37.5 | 62.5 | 11.2 | 25.0 | 314 | 46.7 | 531.0 | 462.4 |
| 25 | 75 | 6.5 | 32.4 | 411 | 49.6 | 439.2 | 317.2 |
| 0 | 100 | 2.0 | 22.5 | 430.6 | 23.8 | 36.3 | 35.7 |

The resulting Platen Pressed films are optically clear and have good balance of toughness and modulus.

EXAMPLE 37

A hydrogenated polymer having a weight ratio of hydrogenated conjugated diene polymer block to hydrogenated vinyl aromatic block of 20:80 and having a block structure of SBSBS and where the total average molecular weight ($Mn_t$) is 75,000 is blended with a hydrogenated polymer having a weight ratio of hydrogenated conjugated diene polymer block to hydrogenated vinyl aromatic block of 68:32 and having a block structure of SBS and where the total average molecular weight ($Mn_t$) is 66,000 in a Brabender Plasticoder at 220° C. for approximately 1 to 2 minutes and the resulting blend is pressed into film using a Platen Press at a temperature of 230° C. for not more than 1 minute and cooled.

The properties of the Platen Pressed films are shown in TABLE 9.

TABLE 9

| Polymer 20:80 | Polymer 68:32 | Tensile Yield (MPa) | Ultimate Tensile (MPa) | % Elong. | Tensile Toughness (MPa) | 1% Secant Modulus (MPa) | 2% Secant Modulus (MPa) |
|---|---|---|---|---|---|---|---|
| 100 | 0 | 10.8 | 25.9 | 4.13 | 0.54 | 924.5 | 868.5 |
| 75 | 25 | 18.9 | 26.0 | 5.436 | 0.93 | 866.2 | 811.1 |
| 68.75 | 31.25 | 21.4 | 18.3 | 8.3 | 1.43 | 709.9 | 689.2 |
| 62.5 | 37.5 | 22.3 | 9.8 | 13.829 | 2.07 | 740.0 | 716.9 |
| 50 | 50 | 16.6 | 20.6 | 291.0 | 44.7 | 581.7 | 555.1 |
| 37.5 | 62.5 | 11.5 | 26.8 | 358.7 | 50.4 | 473.8 | 455.6 |
| 31.25 | 68.75 | 9.9 | 32.4 | 413.5 | 58.1 | 475.2 | 434.4 |
| 25 | 75 | 8.2 | 23.0 | 355.7 | 40.7 | 336.4 | 297.7 |
| 0 | 100 | 2.0 | 22.5 | 430.6 | 23.8 | 36.3 | 35.7 |

The resulting Platen Pressed films are optically clear and have good balance of toughness and modulus.

EXAMPLE 38

A hydrogenated polymer having a weight ratio of hydrogenated conjugated diene polymer block to hydrogenated vinyl aromatic block of 20:80 and having a block structure of SBSBS and where the total average molecular weight ($Mn_t$) is 75,000 is blended with a hydrogenated polymer having a weight ratio of hydrogenated conjugated diene polymer block to hydrogenated vinyl aromatic block of 68:32 and having a block structure of SBS and where the total average molecular weight ($Mn_t$) is 66,000 on a WP ZSK-30 twin screw extruder, where the temperatures are set at 230° C. and where the resulting blend is cast into film on a cast film process where the temperatures are set at 230° C. and the casting roll and chill roll temperatures are set at 110° C. and the draw rate ranges from 1 to 10 fpm (30.5 to 305 cm/min).

The properties of the cast film are shown in TABLE 10.

TABLE 10

|  | 50%/50% Polymer 20:80/ Polymer 68:32 | | 60%/40% Polymer 20:80/ Polymer 68:32 | |
|---|---|---|---|---|
| Tensile Yield (MPa) | 17.2 | 13.8 | 22.1 | 17.2 |
| Ultimate Tensile (MPa) | 35.2 | 34.4 | 14.5 | 23.4 |
| % Elongation | 378 | 359 | 107 | 270 |
| Tensile Toughness (MPa) | 70.6 | 65.9 | 22.7 | 48.5 |
| 1% Secant Modulus (MPa) | 786.0 | 599.8 | 1006.6 | 848.0 |
| 2% Secant Modulus (MPa) | 730.8 | 551.6 | 930.8 | 758.4 |

The resulting films are optically clear and have a good balance of toughness and modulus.

What is claimed is:

1. An emulsion or dispersion comprising:
   I') a dispersed polymer phase comprising at least one hydrogenated block copolymer which comprises at least two distinct blocks of hydrogenated vinyl aromatic polymer, and at least one block of hydrogenated conjugated diene polymer, wherein the hydrogenated copolymer is further characterized by:
   a) a weight ratio of hydrogenated conjugated diene polymer block to hydrogenated vinyl aromatic polymer block of greater than 40:60;
   b) a total number average molecular weight ($Mn_t$) of from 30,000 to 150,000, wherein each hydrogenated vinyl aromatic polymer block (A) has a $Mn_a$ of from 5,000 to 45,000 and each hydrogenated conjugated diene polymer block (B) has a $Mn_b$ of from 12,000 to 110,000; and
   c) a hydrogenation level such that each hydrogenated vinyl aromatic polymer block has a hydrogenation level of greater than 90 percent and each hydrogenated conjugated diene polymer block has a hydrogenation level of greater than 95 percent, II') a surfactant, and III') a continuous phase which is immiscible with the polymer phase.

2. The composition of claim 1 wherein the hydrogenated vinyl aromatic polymer block is selected from the group consisting of hydrogenated polystyrene, hydrogenated alpha-methylstyrene polymer, hydrogenated vinyltoluene polymer, a hydrogenated copolymer of styrene and alpha-methylstyrene, and hydrogenated styrene-vinyltoluene copolymer and the hydrogenated conjugated diene polymer block is selected from the group consisting of hydrogenated polybutadiene, hydrogenated polyisoprene, and a hydrogenated copolymer of butadiene and isoprene.

3. The composition of claim 1 additionally comprising a polymer selected from the group consisting of hydrogenated vinyl aromatic homopolymers, other hydrogenated vinyl aromatic/conjugated diene block copolymers, thermoplastic polyurethanes, polycarbonates (PC), polyamides, polyethers, poly/vinyl chloride polymers, poly/vinylidene chloride polymers, polyesters, polymers that contain lactic acid residuals, partially or non-hydrogenated vinyl aromatic/conjugated diene block polymers, a styrenic polymer, acrylonitrile-butadiene-styrene (ABS) copolymers, styrene-acrylonitrile copolymers (SAN), ABS/PC polymers, polyethylene terephthalate, epoxy resins, ethylene vinyl alcohol copolymers, ethylene acrylic acid copolymers, polyolefin carbon monoxide interpolymers, chlorinated polyethylene, cyclic olefin copolymers (COC's), and olefin homopolymers and copolymers.

4. The composition of claim 3 wherein the additional polymer is selected from the group consisting of a polyolefin, a partially or non-hydrogenated vinyl aromatic/conjugated diene block copolymer, a styrenic polymer, hydrogenated polystyrene, an other hydrogenated vinyl aromatic/conjugated diene block copolymer, and a cyclic olefin (co) polymer derived from monomers selected from the following group: substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes.

5. The composition of claim 3 wherein the composition additionally comprises a compatibilizer.

6. The composition of claim 1 wherein the stabilizer is an alkali or amine fatty acid salt or stearate; polyoxyethylene nonionic; alkali metal lauryl sulfate, quaternary ammonium surfactant; alkali metal alkylbenzene sulfonate, or an alkali metal soap.

7. The composition of claim 1 wherein the continuous phase comprises water.

* * * * *